(12) United States Patent
Ryu et al.

(10) Patent No.: US 11,582,810 B2
(45) Date of Patent: Feb. 14, 2023

(54) METHOD AND APPARATUS FOR ESTABLISHING CONNECTION BETWEEN TERMINAL AND BASE STATION

(71) Applicant: Samsung Electronics Co., Ltd., Suwon-si (KR)

(72) Inventors: Seungbo Ryu, Yongin-si (KR); Dongmin Kim, Seongnam-si (KR); Namryul Jeon, Seoul (KR); Doyoung Jung, Suwon-si (KR); Balgeum Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 17/346,946

(22) Filed: Jun. 14, 2021

(65) Prior Publication Data

US 2021/0307081 A1 Sep. 30, 2021

Related U.S. Application Data

(63) Continuation of application No. 16/606,450, filed as application No. PCT/KR2018/005295 on May 9, 2018, now Pat. No. 11,039,482.

(30) Foreign Application Priority Data

May 11, 2017 (KR) .......................... 10-2017-0058652

(51) Int. Cl.
*H04W 74/08* (2009.01)
*H04W 36/08* (2009.01)
(Continued)

(52) U.S. Cl.
CPC ....... *H04W 74/0833* (2013.01); *H04W 36/08* (2013.01); *H04W 74/002* (2013.01);
(Continued)

(58) Field of Classification Search
None
See application file for complete search history.

(56) References Cited

U.S. PATENT DOCUMENTS 10,045,380 B2 8/2018 Rune et al.
2007/0184865 A1 8/2007 Phan et al.
(Continued)

FOREIGN PATENT DOCUMENTS

KR 10-2008-0098646 A 11/2008
KR 10-2016-0097197 A 8/2016
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 3GPP Standard ; Technical Specification ; 3GPP TS 36.300, 3rd Generation Partnership Project (3GPP), Mobile Competence Centre ; 650, Route Des Lucioles ; F-06921 Sophia-Antipolis Cedex ; France, vol. RAN WG2, Mar. 2017.

(Continued)

*Primary Examiner* — Hong S Cho
(74) *Attorney, Agent, or Firm* — Jefferson IP Law, LLP

(57) ABSTRACT

According to an embodiment of the present disclosure, a terminal may store a time correction value acquired from an RA response message during an RRC layer connection to a base station, receive, from the base station, an uplink resource allocation message including an uplink resource allocated to the terminal, after the RRC layer connection to the base station is released, and when an RRC layer connection to the base station is determined, establish the RRC layer connection to the base station without transmitting an (Continued)

RA preamble message, on the basis of the stored time correction value and the allocated uplink resource.

30 Claims, 21 Drawing Sheets

(51) Int. Cl.
  *H04W 74/00* (2009.01)
  *H04W 76/10* (2018.01)
  *H04W 76/30* (2018.01)
  *H04W 76/27* (2018.01)
(52) U.S. Cl.
  CPC .......... *H04W 76/10* (2018.02); *H04W 76/27* (2018.02); *H04W 76/30* (2018.02)

(56) References Cited

U.S. PATENT DOCUMENTS

| | | |
|---|---|---|
| 2009/0046641 A1 | 2/2009 | Wang et al. |
| 2009/0109912 A1 | 4/2009 | Digirolamo et al. |
| 2014/0233538 A1 | 8/2014 | Zhang et al. |
| 2015/0003430 A1 | 1/2015 | Hole et al. |
| 2016/0323916 A1 | 11/2016 | Lee et al. |
| 2016/0353511 A1* | 12/2016 | Gunnarsson .......... H04W 76/19 |
| 2017/0019930 A1 | 1/2017 | Lee et al. |
| 2017/0118700 A1* | 4/2017 | Lee ....................... H04W 48/20 |

FOREIGN PATENT DOCUMENTS

| | | |
|---|---|---|
| WO | 2015/020478 A1 | 2/2015 |
| WO | 2015137632 A1 | 9/2015 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 14), 3GPP Standard ; Technical Specification, 3GPP TS 36.331,3rd Generation Partnership Project (3GPP), Mobile Competence Centre ; 650, Route Des Lucioles ; F-06921 Sophia-Antipolis Cedex ; France, vol. RAN WG2, No. V14.2.2, Apr. 20, 2017 (Apr. 20, 2017), pp. 1-721, XP051298184.

Extended European Search Report dated Jan. 27, 2020, issued in European Application No. 18797804.4.

* cited by examiner

FIG. 7A

```
RRCConnectionRelease ::=          SEQUENCE {
    rrc-TransactionIdentifier     RRC-TransactionIdentifier,
    criticalExtensions            CHOICE {
        c1                        CHOICE {
            rrcConnectionRelease-r1   RRCConnectionRelease-r1-IEs,
            spare3 NULL, spare2 NULL, spare1 NULL
        },
        criticalExtensionsFuture  SEQUENCE {}
    }
}

RRCConnectionRelease-r1-IEs ::=   SEQUENCE {
    releaseCause                  ReleaseCause,
701 — rachlessInfoList            RachlessInfoList     OPTIONAL,   -- Cond Rachless access
    nonCriticalExtension          RRCConnectionRelease-v1-IEs      OPTIONAL
}

703 — RachlessInfoList ::= SEQUENCE (SIZE (0..maxCandidateCell)) OF RachlessInfo
```

FIG. 7B

```
-- ASN1START

MobilityControlInfo ::=     SEQUENCE {
    targetPhysCellId            PhysCellId
    t304                        ENUMERATED {ms50, ms100, ms150, ms200,                    -- Need ON
                                ms2000, sparei},
    newUE-Identity              C-RNTI                                  OPTIONAL,         -- Need ON
    radioResourceConfigCommon   RadioResourceConfigCommon               OPTIONAL,         -- Need ON
    rach-ConfigDedicated        RACH-ConfigDedicated                    OPTIONAL,         -- Need ON
    candidateCellInfolist       CandidateCellInfoList                   OPTIONAL,         -- Need OP
    rachlessInfo                RachlessInfo                            OPTIONAL,         -- Cond NW-controlled Rachless HO
}
...

CandidateCellInfoList ::=   SEQUENCE (SIZE (0..maxCandidateCell)) OF CandidateCellInfo
CandidateCellInfo ::=       SEQUENCE {
    candidateCellID             PhysCellId,
    rachlessInfo                RachlessInfo                OPTIONAL,  -- Cond UE-based Rachless HO
}
...

RachlessInfo ::= SEQUENCE {
    timesynchronization         ENUMERATED {true}                       OPTIONAL,         -- Need ON
    newUE-identity              C-RNTI                                  OPTIONAL,         -- Need ON
    startingSubframe            INTEGER (1..50)                         OPTIONAL,         -- Need ON
    preulgrantPeriodicity       ENUMERATED {sf0, sf5, sf10, sf20, sf50, sf100, sf200, sf400 }
                                OPTIONAL,      -- Need ON
    preUlgrantTimer             ENUMERATED { s1, s2, s5, s10, s20, s30, min1, min2, min4, min10, min20,
                                min30, hr1, hr2, hr3, hr6, hr12, hr18, day1, day2, day3, day4, day5, day7, day10,
                                day14, day19, day24, day30, dayMoreThan30, infinity, sparei} OPTIONAL,   -- Need ON
}
...

-- ASN1STOP
```

```
RRCRachlessIndication ::= SEQUENCE {
    rrc-TransactionIdentifier    RRC-TransactionIdentifier,
    criticalExtensions           CHOICE {
        rrcRachlessIndication-r1     RRCRachlessIndication-r1-IEs,
        criticalExtensionsFuture     SEQUENCE {}
    }
}

RRCRachlessIndication-r1-IEs ::= SEQUENCE {
    SourcePhysCellId            PhysCellId                                  OPTIONAL,    -- Need ON
    UE-Identity                 C-RNTI                                      OPTIONAL,    -- Need ON
    RachlessIndicationCause     RachlessIndicationCause,
    nonCriticalExtension        RRCRachlessIndication-r1-IEs     OPTIONAL
}

RachlessIndicationCause ::=    ENUMERATED (RACHlessExecution, spare1, spare2, spare3)

-- ASN1STOP
```

```
RRCConnectionRequest ::=          SEQUENCE {
    criticalExtensions              CHOICE {
        rrcConnectionRequest-r1         RRCConnectionRequest-r1-IEs,
        criticalExtensionsFuture        SEQUENCE { }
    }
}

RRCConnectionRequest-r1-IEs ::=   SEQUENCE {
    ue-Identity                     InitialUE-Identity,
    establishmentCause              EstablishmentCause,
    measResultSCell                 BeamMeasResultList    OPTIONAL,    -- Cond Rachless access
    spare                           BIT STRING (SIZE (1))
}

BeamMeasResultList ::=   SEQUENCE (SIZE (1..maxBeamCount)) OF BeamMeasResult
BeamMeasResult ::=       SEQUENCE {
    beamID                   INTEGER (0..511),
    rsrpResult               RSRP-Range,
    ...
}
```

```
RRCConnectionReconfigurationComplete ::= SEQUENCE {
    rrc-TransactionIdentifier      RRC-TransactionIdentifier,
    criticalExtensions             CHOICE {
        rrcConnectionReconfigurationComplete-r1
                                   RRCConnectionReconfigurationComplete-r1-IEs,
        criticalExtensionsFuture   SEQUENCE { }
    }
}

RRCConnectionReconfigurationComplete-r1-IEs ::= SEQUENCE {
    measResultSCell                BeamMeasResultList     OPTIONAL,  -- Cond Rachless access
    nonCriticalExtension           RRCConnectionReconfigurationComplete-v1-IEs  OPTIONAL
}

BeamMeasResultList ::= SEQUENCE (SIZE (1..maxBeamCount)) OF BeamMeasResult

BeamMeasResult ::=    SEQUENCE {
    beamID            INTEGER (0..511),
    rsrpResult        RSRP-Range,
    ...
}
```

830 — (brace for RRCConnectionReconfigurationComplete-r1-IEs block)
831 — (brace for BeamMeasResultList / BeamMeasResult block)

FIG. 8D

```
RRCConnectionReestablishment ::=    SEQUENCE {
    rrc-TransactionIdentifier       RRC-TransactionIdentifier,
    criticalExtensions              CHOICE {
        c1                              CHOICE {
            rrcConnectionReestablishment-r1  RRCConnectionReestablishment-r1-IEs,
            spare7 NULL,
            spare6 NULL,  spare5 NULL,  spare4 NULL,
            spare3 NULL,  spare2 NULL,  spare1 NULL
        },
        criticalExtensionsFuture        SEQUENCE { }
    }
}

RRCConnectionReestablishment-r1-IEs ::= SEQUENCE {
    radioResourceConfigDedicated    RadioResourceConfigDedicated,
    nextHopChainingCount            NextHopChainingCount,
    measResultSCell                 BeamMeasResultList    OPTIONAL,  -- Cond Rachless
    nonCriticalExtension            RRCConnectionReestablishment-v1-IEs  OPTIONAL
}

BeamMeasResultList ::= SEQUENCE (SIZE (1..maxBeamCount)) OF BeamMeasResult
BeamMeasResult ::= SEQUENCE {
    beamID      INTEGER (0..511),
    rsrpResult  RSRP-Range,
    ...
}
```

840 — measResultSCell

841 — BeamMeasResultList / BeamMeasResult block

METHOD AND APPARATUS FOR ESTABLISHING CONNECTION BETWEEN TERMINAL AND BASE STATION

CROSS-REFERENCE TO RELATED APPLICATION(S)

This application is a continuation application of prior application Ser. No. 16/606,450, filed on Oct. 18, 2019, which has issued as U.S. Pat. No. 11,039,482 on Jun. 15, 2021, which is a U.S. National Stage application under 35 U.S.C. § 371 of an International application number PCT/KR2018/005295, filed on May 9, 2018, which is based on and claims priority of a Korean patent application number 10-2017-0058652, filed on May 11, 2017, in the Korean Intellectual Property Office, the disclosure of which is incorporated by reference herein in its entirety.

TECHNICAL FIELD

The disclosure relates to a terminal, a base station, and a control method thereof for reducing latency while establishing an RRC layer connection between the terminal and the base station.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System".

Telecommunication industry organizations including the International Telecommunication Union (ITU) and 3rd Generation Partnership Project (3GPP) proposed three main use cases for the 5G communication system; enhanced mobile broadband (eMBB), ultra-reliable and low latency communications (URLLC), and massive machine type communication (mMTC).

Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system.

In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

In the 5G communication system, a random access channel (RACH) procedure is defined for a terminal to communicate with a base station through a network.

During the RACH procedure, the terminal may perform a radio resource control (RRC) layer connection setup procedure with the base station. The terminal may control logical, transport, and physical channels in association with radio bearer establishment, reestablishment, and release operations with the base station or a network.

DISCLOSURE OF INVENTION

Technical Problem

A terminal has to perform the RACH procedure to attach to a certain network.

For example, if the terminal receives a random access (RA) response message in reply to an RA preamble message transmitted to the base station according to the RACH procedure, it may perform an RRC layer connection procedure with the base station.

In this case, the initial RACH procedure of transmitting the RA preamble message and receiving the RA response message may cause a latency before an RRC layer connection.

For example, whenever the terminal performs an idle-to-active (IdleToActive) state transition procedure or a handover procedure, the initial RACH procedure latency has to increase.

The disclosure provides a method and apparatus for reducing latency before an RRC layer connection between a terminal and a base station.

The disclosure provides a method and apparatus for quickly establishing a connection between a terminal and a base station.

The objects of the disclosure are not limited to the aforesaid, and other objects not described herein will be clearly understood by those skilled in the art from the descriptions below.

Solution to Problem

According to an embodiment of the disclosure, a radio resource control (RRC) layer connection method of a terminal for establishing an RRC layer connection with a base station in a wireless communication system includes storing a timing advance value acquired from a random access (RA) response message in establishing an RRC layer connection with the base station, receiving an uplink resource allocation message indicating downlink resources allocated to the terminal from the base station after releasing the RRC layer connection with the base station, and establishing an RRC connection with the base station by transmitting an RRC layer connection request message with the stored timing advance value and the allocated uplink resources without transmitting an RA preamble message based on a decision being made on an RRC layer connection with the base station.

According to an embodiment of the disclosure, a radio resource control (RRC) layer connection method of a base station for establishing an RRC layer connection with a terminal in a wireless communication system includes transmitting an RRC connection release message for releasing an RRC layer connection established with the terminal to the terminal, the RRC connection release message including RACHless operation information, transmitting, after releasing the RRC layer connection established with the terminal, an uplink resource allocation message to the terminal, the uplink resource allocation message indicating uplink resources allocated to the terminal, and reconfiguring an RRC layer connection with the terminal and transmitting an RRC connection configuration message to the terminal based on a receipt of an RRC connection request message without receiving a random access (RA) preamble message from the terminal.

According to an embodiment of the disclosure, a radio resource control (RRC) layer connection method of a terminal for establishing an RRC layer connection with a base station in a wireless communication system includes transmitting, in a handover of the terminal, an RA preamble message to a base station of a target cell as a handover target while communicating with a base station of a source cell, storing, upon receipt of an RA response message from the base station of the target cell, a timing advance value included in the RA response message, receiving an uplink resource allocation message indicating uplink resources allocated to the terminal from the base station of the target cell, and establishing an RRC layer connection with the base station of the target cell by transmitting an RRC layer reconfiguration request message with the stored timing advance value and the uplink resources allocated by the base station of the target cell without transmitting an RA preamble message based on the handover to the base station of the target cell being determined.

According to an embodiment of the disclosure, a radio resource control (RRC) layer connection method of a terminal for establishing an RRC layer connection with a base station in a wireless communication system includes calculating a timing advance value for a target cell based on a timing advance value for a source cell, frame timing difference information between base stations, and time synchronization information between the base stations while the terminal is communicating with a base station of the source cell, receiving an uplink resource allocation message indicating uplink resources allocated to the terminal from a base station of the target cell, and establishing an RRC layer connection with the base station of the target cell by transmitting an RRC layer reconfiguration request message with the stored timing advance value and the uplink resources allocated by the base station of the target cell without transmitting an RA preamble message based on the handover to the base station of the target cell being determined.

According to an embodiment of the disclosure, a radio resource control (RRC) layer connection method of a base station for establishing an RRC layer connection with a terminal in a wireless communication system includes receiving an RA preamble message including preemptive RACH attach attempt information from the terminal, transmitting to the terminal an RA response message including a timing advance value in response to the RA preamble message, transmitting to the terminal an uplink resource allocation message indicating uplink resources allocated to the terminal in response to the RA preamble message including the preemptive RACH attach attempt information, and establishing an RRC layer connection with the terminal based on an RRC connection reestablishment request message or an RRC connection reconfiguration complete message being received from the terminal, wherein the uplink resource allocation message indicating the uplink resources allocated to the terminal is transmitted periodically before the RRC connection reestablishment request message or the RRC connection reconfiguration complete message is received from the terminal.

According to an embodiment of the disclosure, a terminal for establishing an RRC layer connection with a base station includes a communication circuit configured to communicate with the base station, a storage unit configured to store a timing advance value acquired from a random access (RA) response message in establishing an RRC layer connection with the base station, and a controller configured to control the communication circuit to receive an uplink resource allocation message indicating downlink resources allocated to the terminal from the base station after releasing the RRC layer connection with the base station and establish an RRC layer connection with the base station by transmitting an RRC layer connection request message with the stored timing advance value and the allocated uplink resources without transmitting a RA preamble message based on a decision being made on an RRC layer connection with the base station.

According to an embodiment of the disclosure, a terminal for establishing an RRC layer connection with a base station includes a communication circuit configured to communicate with the base station, a storage unit configured to store a timing advance value for a target cell calculated based on a timing advance value for a source cell, frame timing difference information between base stations, and a controller configured to control the communication circuit to receive an uplink resource allocation message indicating downlink resources allocated to the terminal from the base station after releasing the RRC layer connection with the base station and establish an RRC layer connection with the base station by transmitting an RRC layer connection request message with the stored timing advance value and the allocated uplink resources without transmitting a RA preamble message based on a decision being made on an RRC layer connection with the base station.

According to an embodiment of the disclosure, a base station for establishing an RRC layer connection with a terminal includes a communication circuit configured to communicate with the terminal and a controller configured to control the communication circuit to transmit an RRC connection release message for releasing an RRC layer connection established with the terminal to the terminal, the RRC connection release message including RACHless operation information, transmit, after releasing the RRC layer connection established with the terminal, an uplink resource allocation message to the terminal, the uplink resource allocation message indicating uplink resources allocated to the terminal, and reconfigure an RRC layer connection with the terminal to transmit an RRC connection configuration message to the terminal based on a receipt of an RRC connection request message without receiving a random access (RA) preamble message from the terminal.

According to an embodiment of the disclosure, a terminal for establishing an RRC layer connection with a base station includes a communication circuit configured to communicate with the base station, a storage unit configured to store a timing advance value for a target cell that is acquired from the random access (RA) response message transmitted by a base station of a target cell in response to an RA preamble message transmitted to a base station of the target cell as a handover target while the terminal is in communication with a base station of a source cell, and a controller configured to control the communication circuit to receive an uplink resource allocation message indicating uplink resources allocated to the terminal from the base station of the target cell and transmit an RRC layer reconfiguration request message to the base station of the target cell using the stored timing advance value and the uplink resources allocated by the base station of the target cell without transmitting an RA preamble message, based on the handover decision being made to the base station of the target cell, to establish an RRC layer connection.

According to an embodiment of the disclosure, a terminal for establishing an RRC layer connection with a base station includes a communication circuit configured to communicate with the base station; a storage unit configured to store a timing advance value for a target cell that is calculated based on a timing advance value for the source cell, frame timing difference information between base stations, and time synchronization information between the base stations while the terminal is communicating with the base station of the source cell; and a controller configured to control the communication circuit to receive an uplink resource allocation message indicating uplink resources allocated to the terminal from a base station of the target cell and transmit an RRC layer reconfiguration request message to the base station of the target cell using the stored timing advance value and the uplink resources allocated by the base station of the target cell without transmitting an RA preamble message, based on the handover decision being made to the base station of the target cell, to establish an RRC layer connection.

According to an embodiment of the disclosure, a base station for establishing an RRC layer connection with a terminal includes a communication circuit configured to communicate with the terminal and a controller configured to control the communication circuit to receive an RA preamble message including preemptive RACH attach attempt information from the terminal, transmit to the terminal an RA response message including a timing advance value in response to the RA preamble message, receive an RACHless indication message including RACHless operation information from the terminal, transmit to the terminal an uplink resource allocation message indicating uplink resources allocated to the terminal in response to the RA preamble message including the preemptive RACH attach attempt information, and establish an RRC layer connection with the terminal upon receipt of an RRC connection reestablishment request message or an RRC connection reconfiguration complete message from the terminal.

Advantageous Effects of Invention

The disclosed embodiments are advantageous in terms of dramatically reducing the latency for an RRC connection between a terminal and a base station by dispensing with the initial RACH procedure even when the terminal performs an idle-to-active (IdleToActive) state transition procedure or the terminal or the base station performs a handover procedure.

That is, the latency for an RRC layer connection between a terminal and a base station may be dramatically reduced by dispensing with the initial RACH procedure in such a way that the terminal acquires a timing advance value and the base station transmits an uplink resource allocation message in advance.

Dispensing with the initial RACH procedure is capable of dramatically reducing the latency for the RRC layer connection between the terminal and the base station, particularly when beam mapping information is transmitted along with the RA preamble, which causes a certain degree of time delay, in a beam-based communication mode operating in a high frequency band.

The other effects may be explicitly or implicitly disclosed in the description of the embodiments of the present disclosure. That is, various effects expected from the disclosure will become clear in the following description of the embodiments of the present disclosure.

BRIEF DESCRIPTION OF DRAWINGS

FIGS. 7A, 7B, 8A to 8D, and 9 are diagrams illustrating a message syntax defined for connection latency reduction between a UE and a base station according to an embodiment of the disclosure;

MODE FOR THE INVENTION

Figure 1:
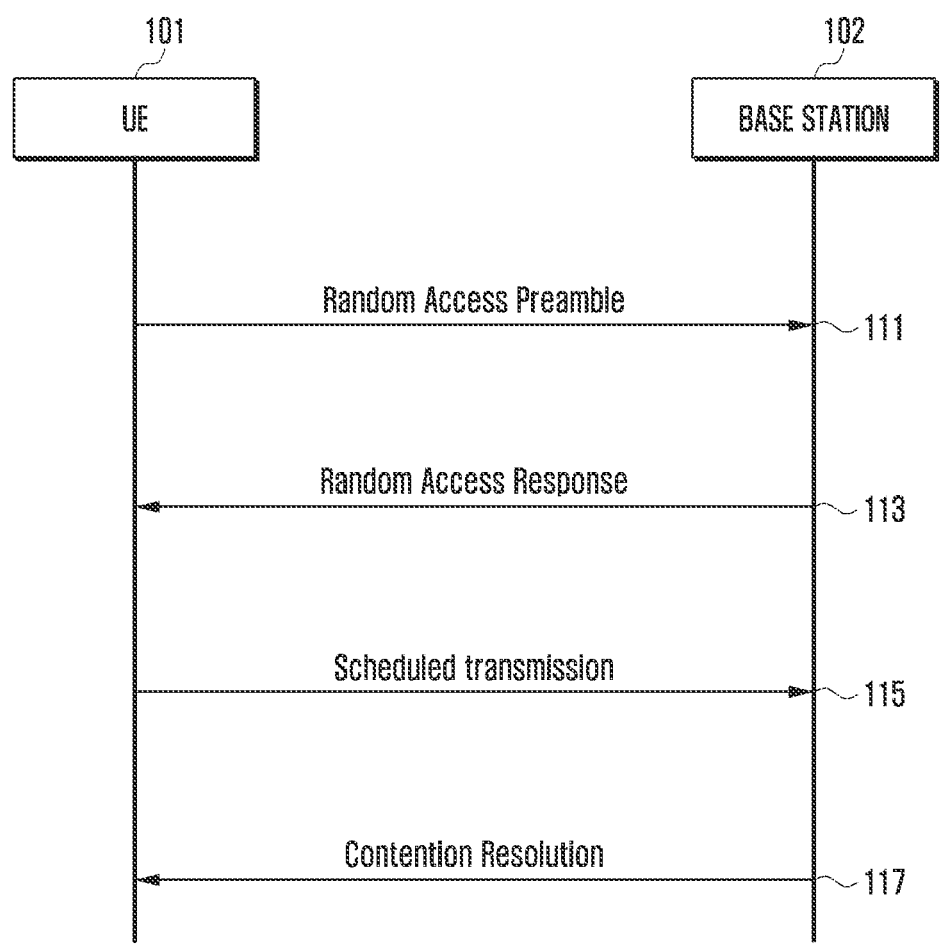
FIG. 1 is a signal flow diagram illustrating an RACH procedure between a base station and a UE.

The operation principle of the disclosure is described in detail with reference to the accompanying drawings. The same reference numbers are used throughout the drawings to refer to the same or like parts; detailed descriptions of well-known functions and structures incorporated herein may be omitted to avoid obscuring the subject matter of the disclosure. Further, the following terms are defined in consideration of the functionality in the disclosure, and they may vary according to the intention of a user or an operator, usage, etc. Therefore, the definition should be made on the basis of the overall content of the present specification.

As used herein, the singular forms are intended to include the plural forms as well, unless the context clearly indicates otherwise.

As used herein, terms such as "first," "second," etc. are used to describe various components. However, it is obvious that the components should not be defined by these terms. The terms are used only for distinguishing one component from another component. For example, a first element may be referred to as a second element and, similarly, the second element may be referred to as the first element. The expression "and/or" is taken as a specific disclosure of each and any combination of enumerated things.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprises" and/or "has" when used in this specification, specify the presence of a stated feature, number, step, operation, component, element, or a combination thereof, but they do not preclude the presence or addition of one or more other features, numbers, steps, operations, components, elements, or combinations thereof.

The phrases "associated with" and "associated therewith" as well as derivatives thereof may mean to include, be included within, interconnect with, contain, be contained within, connect to or with, couple to or with, be communicable with, cooperate with, interleave, juxtapose, be proximate to, be bound to or with, have, have a property of, or the like.

When it is described that a part is (functionally or communicably) "connected to" or "coupled to" another part, this may mean to include not only a case of "being directly connected to" but also a case of "being indirectly connected to" by another device being interposed therebetween.

Unless otherwise defined herein, all terms including technical or scientific terms used herein have the same meanings as commonly understood by those skilled in the art to which the disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Before undertaking the detailed description of the disclosure below, it may be advantageous to set forth definitions of certain words and phrases used throughout the specification. However, it should be noted that the words and phrases are not limited to the exemplary interpretations herein.

The term "base station" denotes an entity communicating with a terminal and may be interchangeably referred to as BS, NodeB (NB), evolved NodeB (eNB), access point (AP), fixed station, base transceiver system (BTS), macro eNB (MeNB), and Secondary eNB (SeNB).

The term "user equipment (or communication terminal)" denotes an entity communicating with a base station or another terminal and may be interchangeably referred to as node, UE, mobile station (MS), mobile equipment (ME), device, user terminal (UT), mobile subscriber station (MSS), subscriber station (SS), advanced mobile station (AMS), wireless terminal (WT), machine-type communication (MTC) device, machine-to-machine (M2M) device, device-to-device (D2D) device, and terminal.

FIG. 1 is a signal flow diagram illustrating an RACH procedure between a base station and a UE.

In reference to FIG. 1, the UE 101 may select physical random access channel (PRACH) resources for transmitting an RA preamble message based on system information received from the base station 102. The UE 101 may transmit an RA preamble signal to the base station 102 on the selected PRACH channel resources at step 111, the RA preamble signal being randomly selected from an RA preamble set.

Here, the RACH signal being transmitted from the UE 101 to the base station 102 may be referred to as "message 1 (Msg 1)".

Next, if the base station 102 receives the RA preamble message on the PRACH channel resources, it may transmit an RA response message to the UE 101 at step 113 in reply to the RA preamble signal. In this case, the RA response signal may include a timing advance (TA) value for uplink synchronization of the UE 101, uplink resources allocated for scheduled transmission, a temporary UE identifier (Temporary C-RNTI), etc.

Here, the RA response signal being transmitted from the base station 120 to the UE 101 at step 113 in response to message 1 (Msg 1) transmitted at step 111 may be referred to as "message 2 (Msg 2)".

The UE 101 may compensate a timing of transmitting data on the uplink channel based on the TA value included in the RA response signal so as to achieve synchronization for a call connection with the base station 102. The UE 101 may receive and store the temporary UE identifier transmitted by the base station 102. The UE 101 may transmit a scheduled transmission message to the base station 102 at step 115 using the TA value and temporary UE identifier received from the base station 102 and uplink resources allocated by the base station 102. The scheduled transmission message may include a UE identifier (C-RNTI, S-TMSI, or Random Id). The UE 101 may establish an RRC layer connection with the base station 102 based on the allocated uplink resources.

Here, the scheduled transmission message being transmitted from the UE 101 to the base station 102 at step 115 in response to message 2 (Msg 2) transmitted at step 113 may be referred to as message 3 (Msg 3) or a different term in use in an embodiment of the disclosure.

Next, the base station 102 may transmit a contention resolution message to the UE 101 at step 117 to avoid collision among UEs 101, the contention resolution message including the identifier received from the UE 101.

Upon receipt of the contention resolution message, the UE 101 may determine whether the UE identifier included in the contention resolution message matches the value it has transmitted. If the identifiers match, the UE 101 may continue the procedure; if the identifiers do not match, the UE 101 may resume the RACH procedure.

Meanwhile, the UE 101 may perform an RRC connection procedure corresponding to message 3 using the allocated uplink resources.

The RRC connection procedure may be a procedure for establishing a logical connection at the RRC layer between the UE 101 and the base station 102.

In this case, establishing the RRC layer connection between the UE 101 and the base station may include establishing a logical connection at the RRC layer between the UE 101 and a network (e.g., cell or E-UTRAN) covered by the base station 102. In the following description, it is assumed that establishing an RRC layer connection includes both the cases where establishing a logical connection at the RRC layer between the UE 101 and the network (e.g., cell or E-UTRAN) covered by the base station 102 is included and not included for convenience of explanation.

A status when an RRC layer connection is established between the UE 101 and the base station 102 may be referred to as RRC active status; a status when the RRC layer connection is released between the UE 101 and the base station 102 may be referred to as RRC idle status. A procedure of transitioning the UE 101 from the RRC idle status to the RRC active status may be referred to as idle-to-active (IdleToActive) procedure.

In the case where the UE 101 performs the IdleToActive procedure or a handover procedure, the above-described RACH procedure may have to be performed.

In this case, an initial RACH procedure between the UE 101 and the base station 102 may lead to latency for a connection. The initial RACH procedure may include transmitting a random access preamble message from the UE 101 to the base station 102 and transmitting a random access response message from the base station 102 to the UE 101. With reference to FIG. 1, the latency may occur as much as the time taken for completing steps 111 and 113.

Given the beamforming-based access in a 5G communication system, the connection latency is likely to further increase because the UE has to perform the RACH procedure per beam in order to transmit strongest synchronization beam information to the base station. A description thereof is made with reference to FIG. 2.

Figure 2:
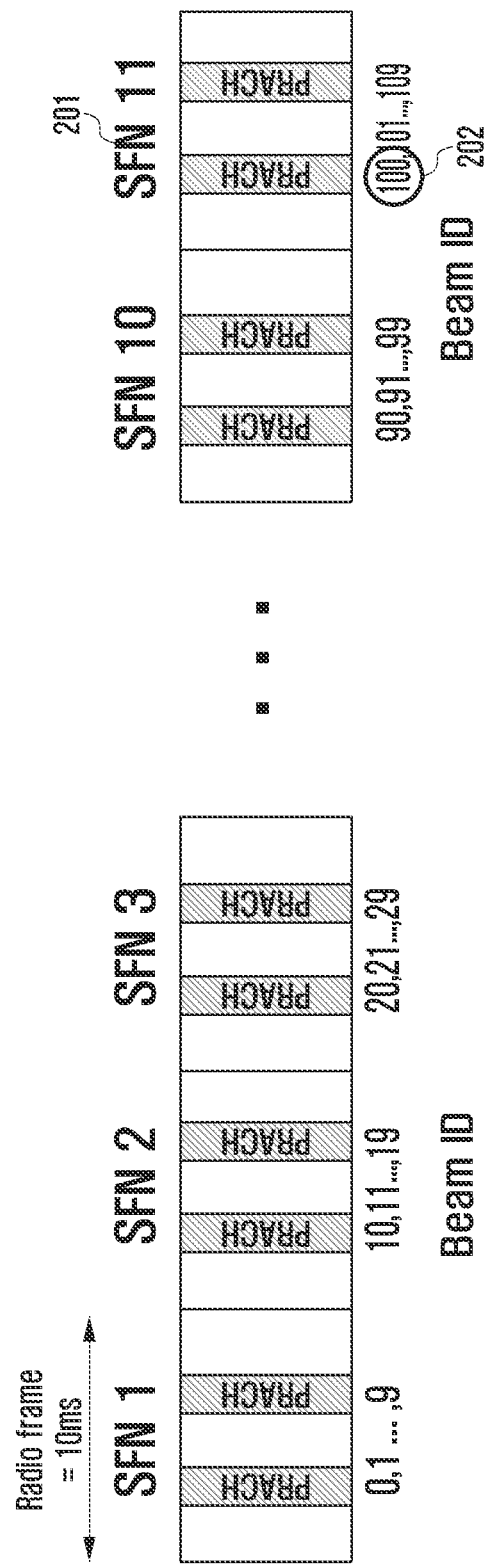
FIG. 2 is a diagram illustrating synchronization symbol indices in use for transmitting strongest synchronization beam information in an RACH procedure according to an embodiment.

FIG. 2 is a diagram illustrating synchronization symbol indices in use for transmitting strongest synchronization beam information in an RACH procedure according to an embodiment.

In reference to FIG. 2, it is assumed that the base station 102 is provided with 112 beams. It is also assumed that two xPRACH subframes are assigned per radio frame and 5 beam indices are mapped per xPRACH subframe. Given that the base station 102 may form 112 beams, the UE 101 may transmit an RA preamble at a position where the strongest synchronization beam is indexed. If the base station receives the RA preamble at the indexed beam position, it may acquire synchronization beam information based thereon and transmit an RA response message to the UE on the corresponding beam. Let's suppose that the $100^{th}$ beam is the strongest beam among the 112 beams available between the UE 101 and the base station 102. In this case, the UE 101 may perform the RACH procedure at the 100th indexed beam position in the RACH subframe. This causes the UE 101 to perform the RACH procedure in the radio frame indexed by the $11^{th}$ system frame number (SFN) 201 according to the synchronization symbol index.

This means that the RACH waiting time is about 100 ms 202 under the assumption that a radio frame spans 10 ms.

In this regard, it may be considered to dispense with at least part of the RACH procedure to reduce the RACH waiting time for the case of performing the IdleToActive procedure or handover procedure. Of course, it should be guaranteed that dispensing with at least part of the RACH procedure does not disrupt communication.

Figure 3:
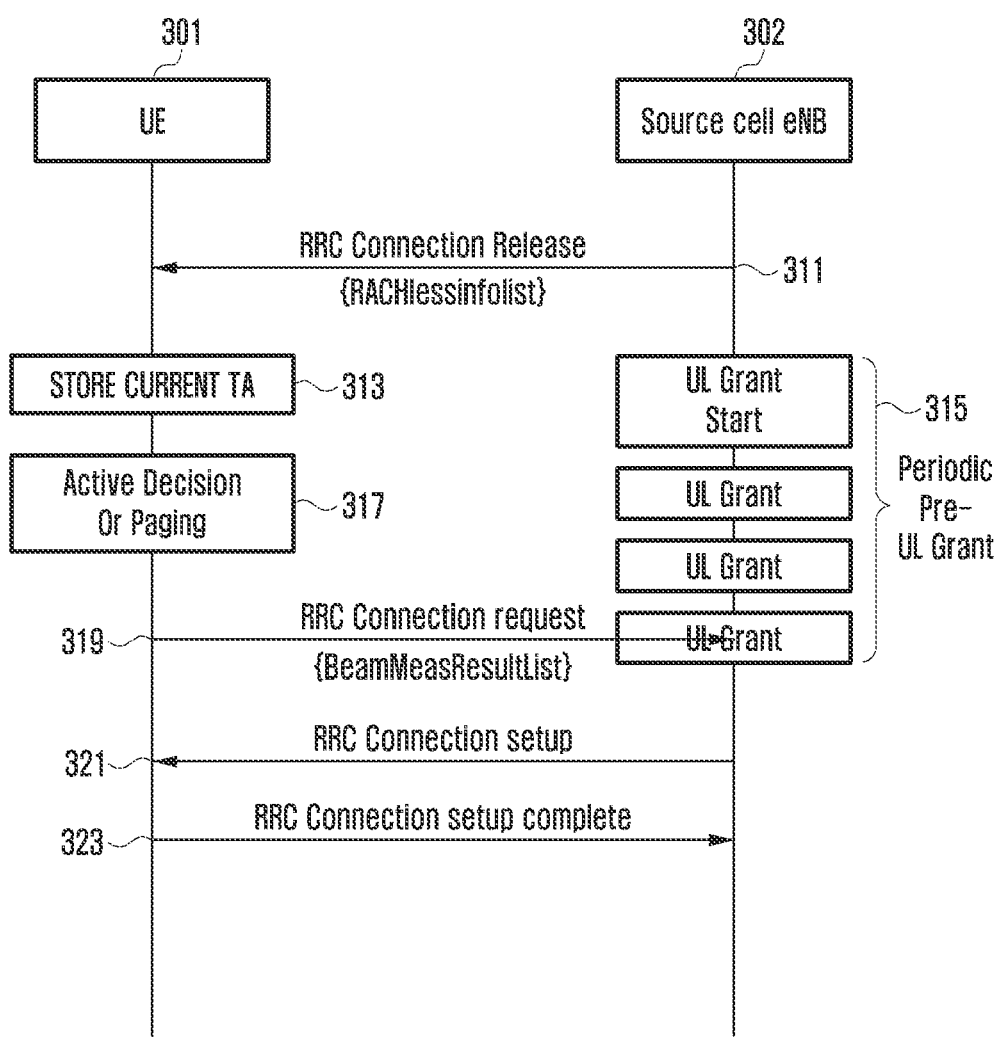
FIGS. 3 to 5 are signal flow diagrams illustrating a procedure for reducing latency for RRC layer connection between a terminal and a base station according to an embodiment of the disclosure.

FIG. 3 is a signal flow diagram illustrating a method for reducing latency for an RRC layer connection between a UE 301 and a base station 302 for the case of an IdleToActive procedure of the UE 301 according to an embodiment of the disclosure.

In FIG. 3, the UE 301 may be in the middle of communication after achieving synchronization with the base station covering a source cell based on a TA value for the source cell.

In this situation, the base station 302 may transmit an RRC Connection Release message to the UE 301 at step 311 to transition the UE 301 from a connected state to an RRC idle status. For example, the RRC Connection Release message may include an RACHless operation information list (RACHlessinfoList) indicative of dispensing with at least part or all of the RACH procedure.

A format and insertion position of the RACHless operation information included in the RRC Connection Release message is described later in detail with reference to the accompanying drawings.

Upon receipt of the RRC Connection Release message, the UE 301 may transition to the idle status.

Upon receipt of the RRC Connection Release message, the UE 301 may also store, at step 313, a TA value for a target cell or the base station 302 that has been acquired through the RACH procedure for establishing an RRC layer connection with the base station 302.

After transmitting the RRC Connection Release message, the base station 302 may periodically allocate, at step 315, uplink resources (UL grant) to the UE 301 to which the RRC Connection Release message has been transmitted and transmit an uplink resource allocation message to the UE 301.

Afterward, an RRC layer connection may be requested. For example, the UE 301 may make an RRC connection determination (e.g., user's call attempt determining RRC connection) or receive a paging message (e.g., paging message triggered by a call placed by a counterparty) at step 317. That is, an IdleToActive procedure for transitioning from the RRC idle status to the RRC active status may be triggered.

In this case, the UE 301 may dispense with at least part or all of the RACH procedure and establish an RRC layer connection with the base station 302 using the TA value stored at step 313 and the resources pre-allocated by the base station 302. Here, at least part of being dispensed with in the RACH procedure may include at least one of a procedure of transmitting an RA preamble message from the UE 302 to the base station 302, a procedure of transmitting an RA response message from the base station 302 to the UE 301, or a procedure of transmitting a contention resolution message from the base station 302 to the UE 301. Here, the at least part of the RACH procedure may include dispensing with all of the RACH procedure.

In detail, if the IdleToActive procedure is triggered, the UE 301 may transmit an RRC Connection Request message corresponding to message 3 to the base station 302 at step 319 using the previously stored TA value and pre-allocated uplink resources. At this time, information on a beam of the base station 302 that is measured by the UE 301 may be transmitted as well. Upon receipt of the RRC Connection Request message from the UE 301, the base station 302 may use the corresponding beam for communication with the UE 301 based on the beam information received from the UE 301. Upon receipt of the RRC Connection Request message corresponding to message 3, the base station 302 may stop the periodic uplink resource allocation (UL grant) message transmission to the UE 301 according to the proposed RACHless operation.

The base station 302 may transmit an RRC Connection Setup message to the UE 301 at step 321 in response to the RRC Connection Request message.

Upon receipt of the RRC Connection Setup message, the UE 301 may transition to the RRC active status. Next, the UE 301 may transmit an RRC Connection Setup Complete message to the base station 302 at step 323 to confirm that the RRC connection is established successfully.

Figure 4:
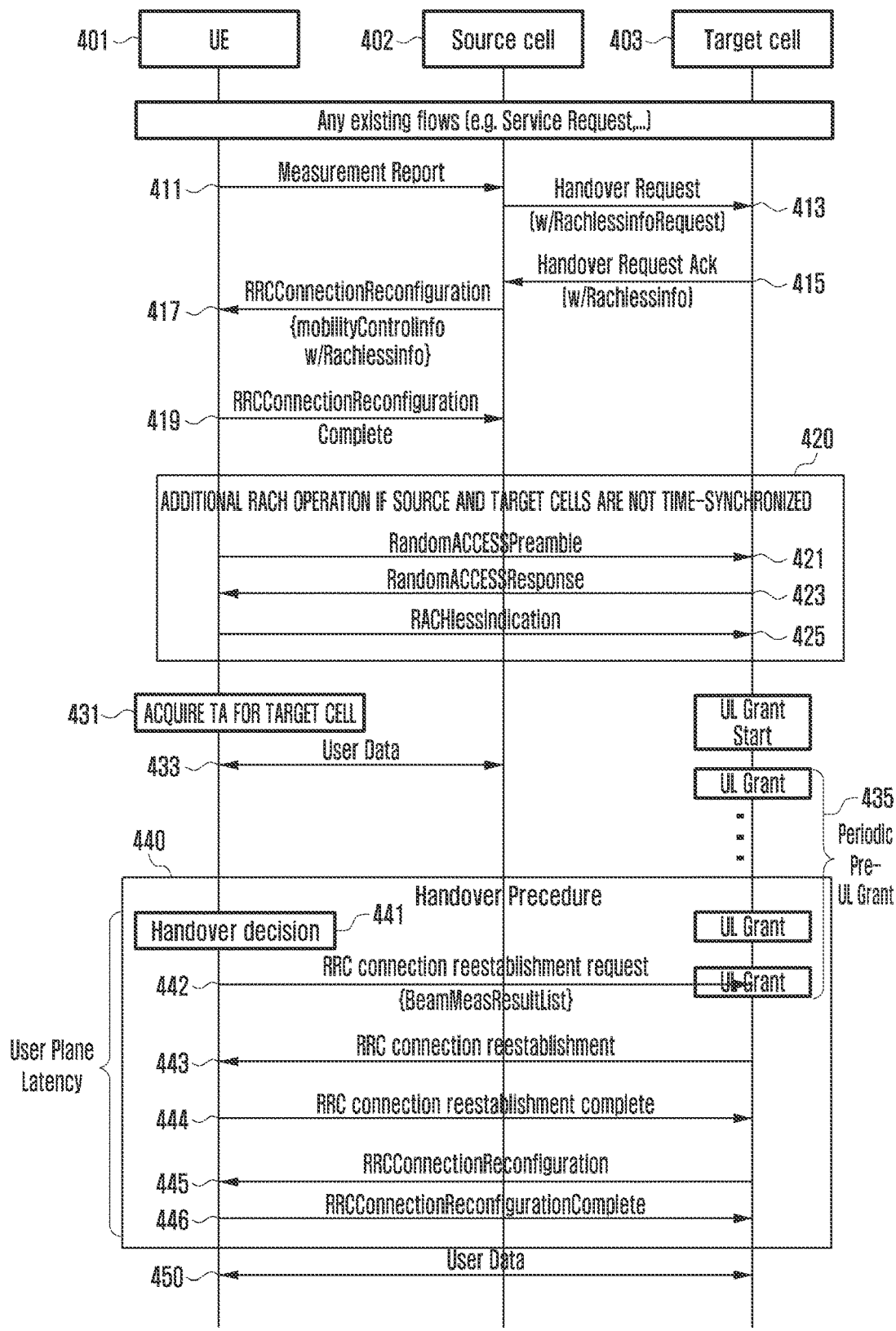

FIG. 4 is a signal flow diagram illustrating a method for reducing latency for an RRC layer connection between a UE 401 and a base station 402 for the case of a handover of the UE 401 according to a UE-based handover procedure.

Although not shown in FIG. 4, the base station 402 covering a source cell may transmit a measurement configuration message for a handover to the UE 401 while establishing an RRC connection between the UE 401 and the base station 402 covering the source cell. The measurement configuration message may include information indicating cells on which the UE 401 performs measurement. Although not shown in FIG. 4, the source cell base station 402 may transmit in advance to the UE 401 an RRC Connection Reconfiguration (RRCConnectionReconfiguration) message including information on whether the source cell and neighboring base stations are time-synchronized (Time Synchronization). For example, such information may be transmitted in the initial attach procedure with the source cell base station 402.

If the UE 401 receives the measurement configuration message, it may measure signal qualities (e.g., signal strength and signal-to-interference ratio, etc.) of the cells indicated in the measurement configuration message. Afterward, at step 411, the UE 401 may transmit to the source cell base station 402 a Measurement Report message including information on the measured signal qualities.

If there is a candidate handover target cell for the UE 401, the source cell base station 402 may request to the candidate cell for RACHless operation information (RACHlessinfo), and the candidate cell may send the RACHless operation information to the source cell. A detailed description thereof is made with reference to the accompanying drawings.

At step 413, the source cell base station 402 may transmit a Handover Request message to a target cell base station 403 for handover of the UE 401. Here, the Handover Request message being transmitted from the source cell base station 402 to the target cell base station 403 may include an RACHless operation request (RachlessinforRequest). This may include information to request for dispensing with at least part or all of the RACH procedure for the case of a handover of the UE 401 to the target cell base station 403.

If the target cell base station 430 receives the Handover Request message at step 413, it may transmit a Handover Request Ack message to the source cell base station 402 at step 415. If it is possible for the target cell base station 403 to dispense with at least part or all of the RACH procedure, the target cell base station 403 may include the RACHless operation information (RACHlessinfo) in the Handover Request Ack message. The target cell base station 403 may transmit the RACHless operation information (RACHlessinfo) in the Handover Request Ack message in response to the RACH-less operation request (RachlessinfoRequest) included in the Handover Request message transmitted at step 413 by the source cell base station 402.

At step 417, the source cell base station 402 may transmit to the UE 401 an RRC Connection Reconfiguration (RRCConnectionReconfiguration) message including candidate cell information. In this case, the RRC Connection Reconfiguration message may include RACHless operation information (RACHlessinfo) indicating the candidate cells supporting the RACHless operation and mobility control information (mobilityControlinfo). The mobility control information (mobilityControlinfo) may include access information for the target cell base station 403. A format of the RACHless operation information included in the RRC Connection Reconfiguration message is described later with reference to the accompanying drawings.

Upon receipt of the RRC Connection Reconfiguration message, the UE 401 may transmit to the base station 402 an RRC Connection Reconfiguration Complete (RRCConnectionReconfigurationComplete) message at step 419 to provide notification that the RRC connection reconfiguration has been successfully completed.

If necessary, e.g., if the UE 401 detects that the source cell base station 402 and the target cell base station 403 are not time-synchronized, it may perform the RACH procedure. If necessary, the UE 401 may preemptively perform at least part of the RACH procedure 420 with the handover target cell base station 403 before a handover is triggered.

At step 421, the UE 401 may transmit an RA preamble message to a candidate handover target cell base station 403. That is, the UE 401 may preemptively perform at least part of the RACH procedure with at least one candidate cell base station as a handover target. For example, the UE 401 may perform at least part of the RACH procedure with a candidate cell's base station while it is communicating with the source cell base station 402.

If the target cell base station 403 receives the RA preamble message, it may transmit to the UE 401, at step 423, an RA response message including a TA value.

If the UE 401 receives the RA response message, it may generate an RACHless Operation Indication message for notifying the target cell base station 403 of the preemptive RACH attempt to the target cell base station 403 and transmit the message to the target cell base station 403 at step 425. At step 431, the UE 401 may acquire the TA value for the target cell base station 403 that is included in the RA Response message received at step 423.

Meanwhile, if the UE 401 detects that the source cell base station 402 and the target cell base station 403 were time-synchronized, it may acquire, at step 431, a TA value for the target cell based on the TA value for the source cell base station and a timing difference value between the source cell base station 402 and the target cell base station 403 and store the acquired TA value, dispensing with the RACH procedure, i.e., steps 421 to 425.

If the target cell base station 403 receives a message indicative of dispensing with at least part of the RACH procedure from the UE 401 that acquired the TA value, it may allocate uplink resources to the UE 401 and transmit an uplink resource allocation message to the UE 401 periodically at step 435.

During this procedure, the UE 401 may transmit or receive user data to and from the source cell base station 402 at step 433.

In this situation, the UE 401 may make a handover decision at step 441. That is, a handover of a communication service from the source cell base station 402 to the target cell base station 403 may be triggered. For example, if the UE 401 is a fixed Customer Premises Equipment (CPE) that rarely moves, a handover may occur when a beam formed in a direction is blocked by an obstacle.

In this case, the UE 401 may dispense with at least part of the RACH procedure and establish an RRC layer connection with the target cell base station 403 using a stored TA value and uplink resources allocated in advance by the target cell base station 403.

In detail, at step 442, the UE 401 may transmit to the target cell base station 403 an RRC Connection Reestablishment Request message corresponding to message 3. At this time, base station beam information measured by the UE 401 may be transmitted along with the message such that the target cell base station 403 is capable of using a beam for communication with the UE 401 based on the corresponding beam information. Upon receipt of the RRC Connection Reestablishment Request message corresponding to message 3, the target cell base station 403 may stop the periodic transmission of the uplink resource allocation (UL grant) message for RACH-less operation.

Upon receipt of the RRC Connection Reestablishment Request message, the target cell base station 403 accepts the RRC connection reestablishment and transmits an RRC Connection Reestablishment message to the UE 401 at step S443.

Upon receipt of the RRC Connection Reestablishment message, the UE 401 may transmit an RRC Connection Reestablishment Complete message to the target cell base station at step 444 to provide notification that the RRC connection reestablishment procedure is completed.

Meanwhile, if the UE 401 receives an RRC Connection Reconfiguration (RRCConnectionReconfiguration) message from the target cell base station 435 at step 445, it may transmit an RRC Connection Reconfiguration Complete (RRCConnectionReconfigurationComplete) message to the target cell base station 403 at step 446 in response to the RRC Connection Reconfiguration message.

The above described operations of steps 441 to 446 may constitute a handover procedure 440.

Afterward, the UE 401 may transmit or receive user data to and from the target cell base station 403 at step 450.

Figure 5:
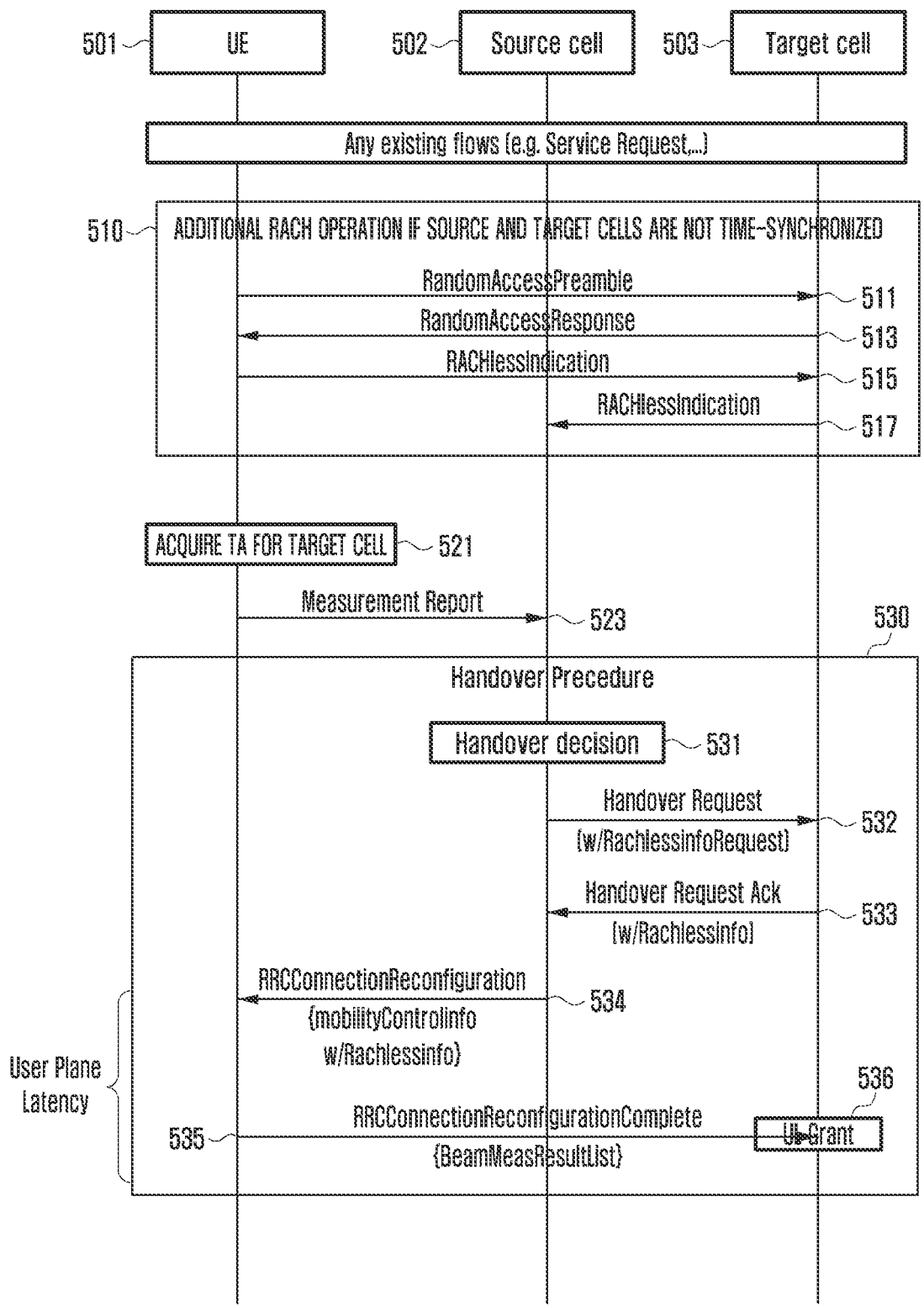

FIG. 5 is a signal flow diagram illustrating a method for reducing latency for an RRC layer connection between a UE 501 and a base station 502 for the case of a network-controlled handover procedure.

As described above, if necessary, e.g., if the UE 501 detects that the source cell base station 502 and the target cell base station 503 are not time-synchronized, it may preemptively acquire a TA value for the target cell base station 503 through at least part of the RACH procedure and store the TA value. Steps 511 to 515 through which the UE 501 acquires the TA value may correspond to steps 421 to 425 of FIG. 4.

At step 515, in order notify the target cell base station 503 of the preemptive RACH attempt according to the RACH-less operation, the UE 501 may generate and transmit an RACHless indication (RACHlessIndication) message to the target cell base station 503. The RACHless indication (RACHlessIndication) message may include information indicating that at least part of the RACH operation may be dispensed with afterward for a handover of the UE 501 to the target cell base station 530.

The target cell base station 503 may transmit RACH-less indication (RACHlessIndication) information to the source cell base station 502 at step 517 in order for the source cell base station 502 to use the information afterward in selecting a target cell for a handover of the UE through an RACHless operation.

As described above, steps 511 to 517 may be performed in the case where the source cell base station 502 and the target cell base station 503 are not time-synchronized. Step 511 to step 517 at which the target cell base station transmits the RACHless indication (RACHlessIndication) information to the source cell base station 502 may be an operation for achieving synchronization preemptively between the target cell base station 503 and the UE 501. At step 521, the UE 501 stores the TA value received at step 513 from the target cell base station 503.

If the UE 501 detects that the source cell base station 502 and the target cell base station 503 were time-synchronized, it may acquire, at step 521, a TA value of the target cell base station 503 based on the TA value of the source cell base station 502 and a timing difference value between the source cell base station 502 and the target cell base station 503 and store the acquired TA value, dispensing with the RACH procedure, i.e., steps 511 to 515.

At step 523, the UE 501 may transmit to the source base station 502 a Measurement Report message including signal quality measurement information.

In this situation, the source cell base station 502 may make a handover decision for the UE 501 at step 531.

At step 532, the source cell base station 502 may transmit to the target cell base station 503 as a candidate cell a Handover Request message including an RACH-less operation request (RACHlessinfoRequest). At step 533, in reply the target cell base station 503 as a candidate cell may transmit to the source cell base station 502 a Handover Request Ack message including RACHless operation information (Rachlessinfo).

At step 534, the source cell base station 502 may transmit to the UE 501 an RRC Connection Reconfiguration (RRCConnectionReconfiguration) message including the RACH-less operation information (Rachlessinfo) including information on candidate cells available for the RACHless operation. The RRC Connection Reconfiguration message may include mobility control information associated with information on access to the target cell base station 502 (e.g., frequency and channels of the target cell).

Upon receipt of the RACHless operation request (RACHlessinfoReqeust) message from the source cell base station 502, the target cell base station 503 may allocate uplink resources to the UE 501 at step 536 in association with the RACH-less operation request (RACHlessinfoRequest) and transmit an uplink resource allocation (UL grant) message to the UE 501.

If the UE 501 receives the RRC Connection Reconfiguration message, it may transmit, at step 535, to the target cell base station 503 an RRC Connection Reconfiguration Complete message corresponding to message 3 for confirmation of successful RRC connection establishment using the TA value saved at step 521 and pre-allocated uplink resources, dispensing with the RACH procedure with the target cell base station 503. At this time, UE-measured base station beam information may be transmitted as well in order for the target cell base station 503 to use a beam for communication with the UE 501 based on the beam information.

Figure 6:
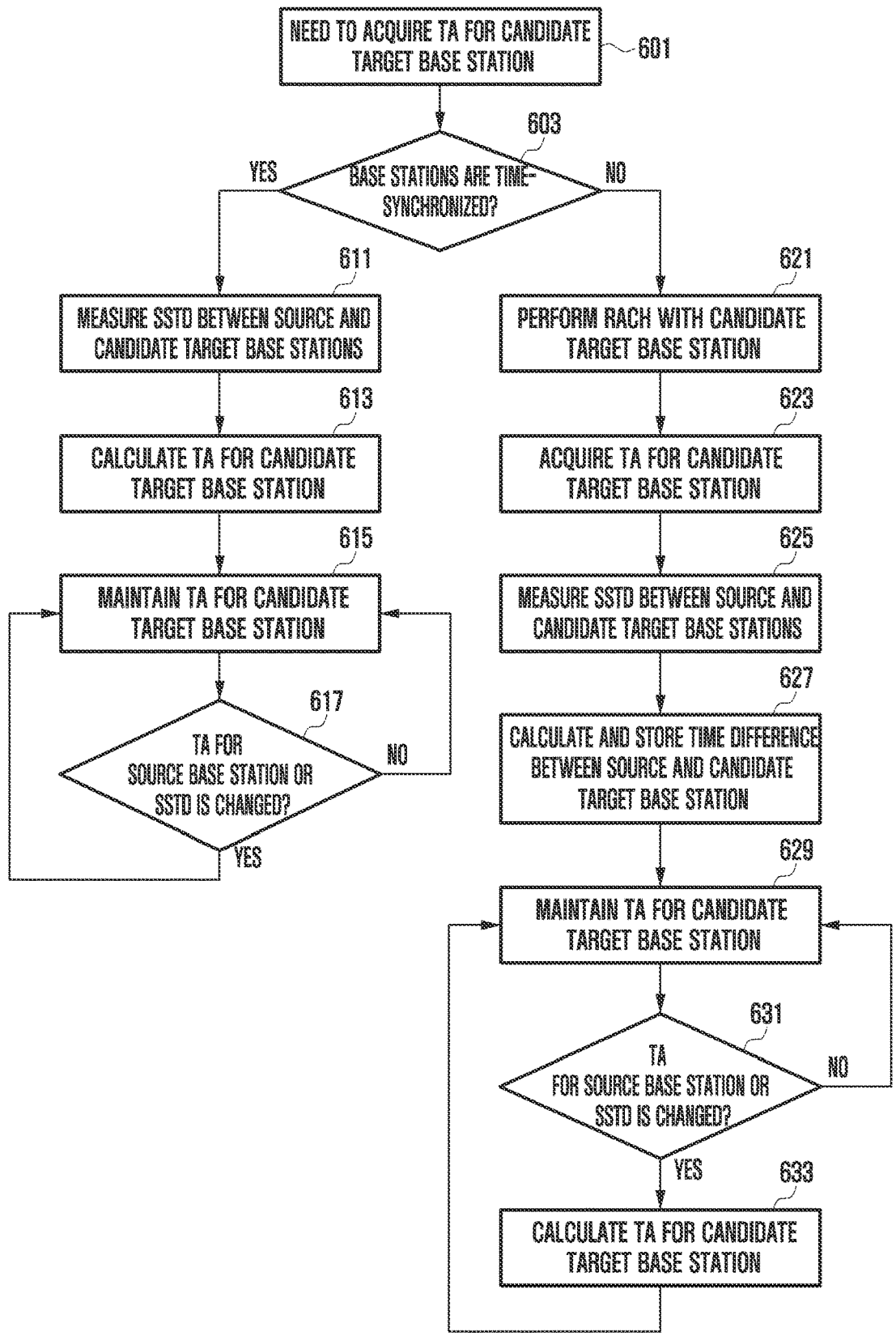
FIG. 6 is a flowchart illustrating a procedure for a UE to acquire a TA value from a candidate target cell and update the TA value according to an embodiment of the disclosure.

FIG. 6 is a flowchart illustrating a procedure for a UE to acquire a TA value from a candidate target cell and update the TA value according to an embodiment of the disclosure.

At step 601, if the UE detects a need to acquire the TA value for a candidate cell, it may receive, in advance, an RRC Connection Reconfiguration (RRCConnectionReconfiguration) message, including information on whether the source cell is time-synchronized with neighboring base stations, from a source cell base station. For example, such information may be received in an initial attach procedure with the source cell.

If it is determined at step 603 that the source cell base station and the target cell base station are time-synchronized, the UE may measure a subframe timing difference (SFN and Subframe Timing Difference (SSTD)) between the source cell base station and the target cell base station at step 611.

At step 613, the UE may calculate the TA value for the target cell base station using the TA value of the source cell and the SSTD value. At step 615, the UE stores the TA value calculated for the target cell base station and maintains the TA value while the target cell base station or the source cell base station is valid. At step 617, the UE may determine whether the TA value for the source cell base station and/or the SSTD value is changed. If it is determined that the TA value for the source cell base station and/or the SSTD value is changed, the UE performs the operation of step 613 again with the changed value to recalculate the TA value for the target cell base station. If it is determined that the TA value for the source cell and/or SSTD value is not changed, the UE may maintain the TA value for the candidate target cell base station.

If it is determined that the source cell base station and the target cell base station are not time-synchronized, the UE may perform a preemptive RACH procedure with the target cell at step 621. At step 623, the UE acquires the TA value for a current target cell base station. At step 625, the UE may measure the SSTD value between the source cell base station and the target cell base station. At step 627, the UE may calculate a time difference value between the source cell base station and the target cell base station.

At step 629, the UE may maintain the time difference value for the candidate target cell base station while the candidate target cell base station or the source cell base station is valid. Afterward, the UE may determine at step 631 whether the TA value for the source cell base station and/or SSTD value is changed. If it is determined that the TA value for the source cell base station and/or SSTD value is changed, the UE may recalculate the TA value for the candidate target cell base station at step 633. After the UE recalculates the TA value for the candidate target cell base station, the procedure may go back to step 629. If it is determined that the TA value for the source cell base station and/or SSTD value is not changed, the UE may maintain the TA value for the candidate target cell base station.

Hereinafter, descriptions are made of the method for calculating the TA value for the candidate target cell base station in the case where the source cell base station and the target cell base station are not time-synchronized and the method for calculating the TA value for the candidate target cell base station in the case where the source cell base station and the target cell base station are time-synchronized with reference to Equations.

A TA value between the source cell base station (source 5G Node-B) and the UE may be denoted by TASource. The UE may update the TA value for the source cell base station periodically to acquire the TASource value.

A TA value between the candidate target cell base station (target 5G Node-B) and the UE may be denoted by TATarget.

An SFN measured by the UE for the source cell base station may be denoted by SFNsource, the SFN measured by the UE for the target cell base station may be denoted by SFNtarget, and the SFN offset between the source cell base station and the target cell base station (target 5G Node-B) may be denoted by $SSFB_{offset}^{time}$ of which a range is set from radio frame 0 to radio frame 1023.

A radio frame start time measured by the UE for the source cell is denoted by TRadioframeBoundarySource, a radio frame start time measured by the UE for the target cell may be denoted by TRadioframeBoundaryTarget, and a radio frame boundary offset between the source cell base station and the target cell base station may be denoted by $RFB_{offset}^{time}$ of which a range is set from subframe −25 to subframe 24. A subframe start time measured by the UE for the source cell base station may be denoted by TSubframeBoundarySource, a subframe start time measured by the UE for the target cell base station may be denoted by TSubfadioframeBoundaryTarget, and a subframe boundary offset between the source cell base station and the target cell base station may be denoted by of $SFB_{offset}^{time}$.

A transmission time offset between the source cell base station and the target cell base station may be denoted by TIoffset.

A unit of time Ts may be set to $1/(2048\times15000)=1/30720000$ sec, and TA=16×Ts. A radio frame time period may be denoted by Tradioframe.

Equation 1 is established with the above parameters.

$$SFN_{offset}^{frame} = (SFN_{source} - SFN_{target}) \bmod 1024$$

$$SFN_{offset}^{time} = SFN_{offset}^{frame} \times T_{RadioFrame} \text{ [ms]}$$

$$RFB_{offset}^{time} = \left\lfloor \frac{T_{RadioframeBoundarySource} - T_{RadioframeBoundaryTarget}}{T_{Subframe}} \right\rfloor \times T_{Subframe} \text{ [ms]}$$

$$SFB_{offset}^{time} = \lfloor T_{SubframeBoundarySource} - T_{SubrameBoundaryTarget} \rfloor \text{ [ms]}$$

Equation 1

As described above, in the case where the source cell base station and the target cell base station are time-synchronized, i.e., $TI_{offset}=0$, TATarget may be calculated by Equation 2.

$$TA_{target}=[(TA_{Source}\times16\times T_s)-SFN_{offset}^{time}-RFB_{offset}^{time}-SFB_{offset}^{time})/16\times T_s)]$$

Equation 2

Even when the TASource value and/or the SSTD value are changed, the TATarget may be recalculated by Equation 2 using these values.

In the case where the source cell base station and the target cell base station are not time-synchronized, i.e., $TI_{offset}\pm0$, the UE acquires $TA_{Target}^{Pre-RACH}$ through a pre-emptive RACH procedure with the target cell base station and then calculates $TI_{offset}$ based on $TA_{Target}^{RACH}$.

The $TI_{offset}$ may be calculated by Equation 3.

$$TI_{offset}=(TA_{Source}\times16\times T_s)-SFN_{offset}^{time}-RFB_{offset}^{time}-SFB_{offset}^{time}-TA_{Target}^{Pre-RACH}$$

Equation 3

After acquiring the $TI_{offset}$, the TATarget may be calculated by Equation 4.

$$TA_{Target}=[(TA_{Source}\times16\times T_s)-SFN_{offset}^{time}-RFB_{offset}^{time}-SFB_{offset}^{time}-TI_{offset})/(16\times T_s)]$$

Equation 4

As described above, the TATarget may be calculated using the $TI_{offset}$ calculated with the $TA_{Target}^{Pre-RACH}$ that is obtained through the preemptive RACH procedure with the target cell base station.

If the TASource and SSTD values are changed afterward, the TATarget may be calculated by Equation 4 using the changed values.

FIGS. 7A, 7B, 8A to 8D, and 9 are diagrams illustrating a message syntax defined for connection latency reduction between a UE and a base station.

Although the messages shown in FIGS. 7A, 7B, 8A to 8D, and 9 include information elements having specific names and placed at specific locations, the names and locations are just exemplary and may be changed to preferred names for the same or similar purposes as the standardization process progresses.

The information elements included in the messages of FIGS. 7A, 7B, 8A to 8D, and 9 may be added to the reserved fields of the messages in use in the legacy standard or replace legacy information elements so as to be transmitted to individual entities or transmitted using a separate new message.

The message syntax of FIG. 7A may correspond to the RRC Connection Release message being transmitted from the base station 302 to the UE 301 at step 311 of FIG. 3.

The RRC Connection Release message may include RACHless operation information list (RACHlessinfoList) 701 as information indicating that the base station 302 supports dispensing with at least part of the RACH procedure. This information may include consecutive sequences (SEQUENCE) 703 of the RACHless operation information (RACHlessinfo). Detailed items of RACHless operation information (RACHlessinfo) are specified in a sequence (SEQUENCE) 720.

The message syntax of FIG. 7B may correspond to the RRC Connection Reconfiguration (RRCConnectionReconfiguration) message being transmitted from the source cell base station 402 to the UE 401 at step 417 of FIG. 4.

In the case of performing a handover according to the network-controller handover procedure, RACHless operation information (RACHlessinfo) 710 indicating that the candidate target cell base station supports dispensing with RACH procedure may be included in MobilityControlInfo of the RRC Connection Reconfiguration message. In the case of performing a handover according to the UE-based Hanover procedure, an RACHless operation information list (RACHlessinfoList) 715 indicating that the candidate target cell base station supports dispensing with the RACH procedure may be included in CandidateCellInfoList of the RRC Connection Reconfiguration message. The RACHless operation information 710 may include detailed information 720 as follows.

(1) Time sync information between source cell and candidate target cell (2) C-RNTI ID information for use in candidate target cell (3) Start subframe information for UL grant of candidate target cell (4) UL grant periodicity information of candidate target cell (5) UL grant termination timer of candidate target cell The message syntax of FIG. 8A may correspond to an RACH-less Indication (RACHlessIndication) message being transmitted from the UE to the target cell base station at step 425 of FIG. 4 and at step 515 of FIG. 5 and include an RACH-less Indication (RACHlessIndication) syntax 810.

The RACHless Indication (RACHlessIndication) message may be used for the purpose of requesting to a base station for starting uplink resources for the UE or for the purpose of notifying the target cell base station and the source cell base station that the UE has a TA value acquired in advance.

The message syntax of FIGS. 8B to 8D is of the RRC Connection Request message corresponding to message 3 that is transmitted from the UE to the base station using pre-allocated uplink resources. The message syntax of FIGS. 8B to 8D includes UE-measured base station beam information 820, 821, 830, 831, 840, and 841 for use by a base station in communication with the UE using a beam.

Figure 9:
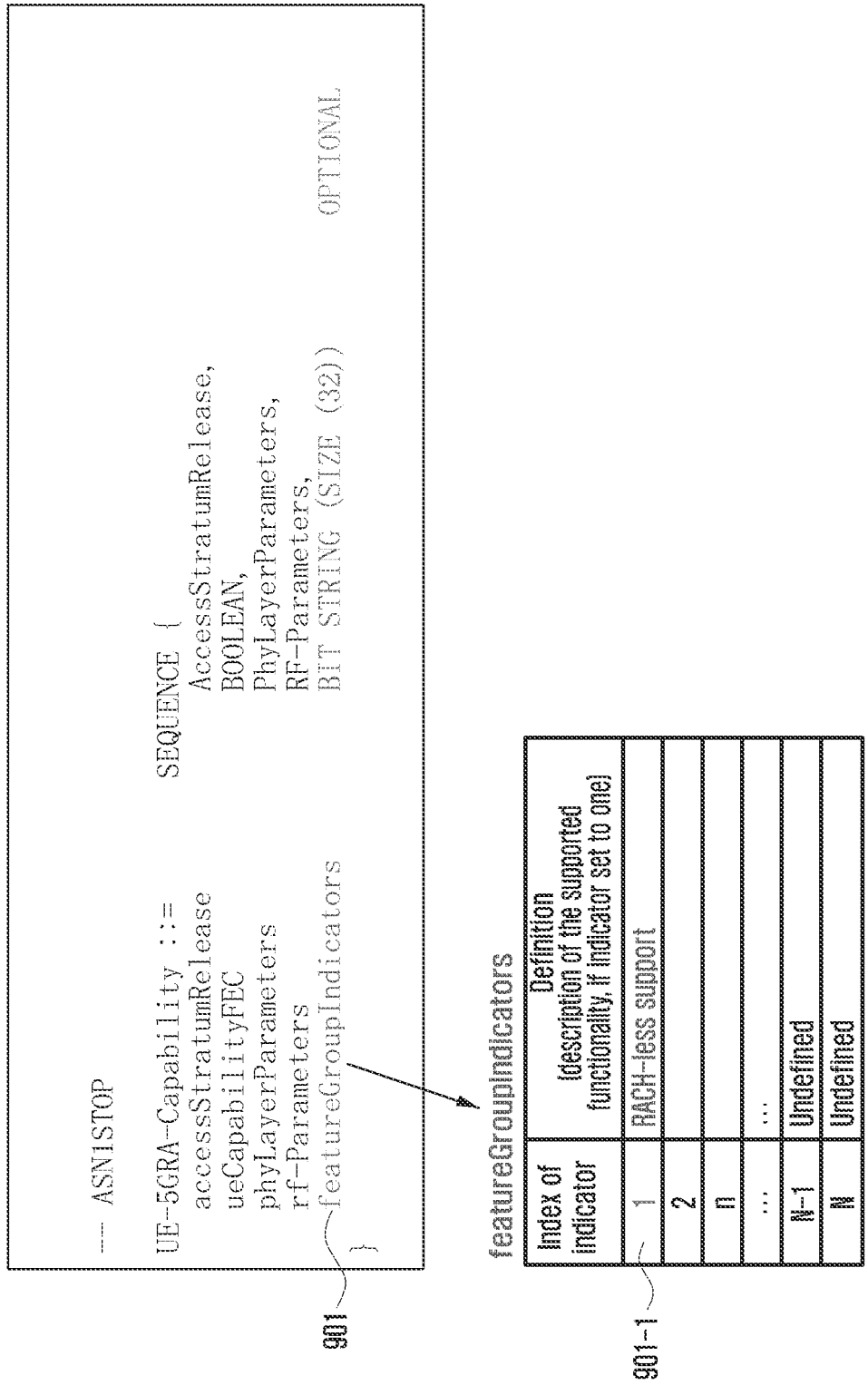

The message syntax of FIG. 9 may correspond to a UE capability information message as an RRC message being transmitted from a UE to a base station.

The UE capability information message may include a feature group indicators (featureGroupIndicators) information element 901 defining features to be implemented at the UE.

In this case, the feature group indicators information element 901 may include a flag, which may be used for the purpose of indicating whether the UE supports dispensing with at least part of the RACH procedure as proposed in the disclosure.

Figure 10:
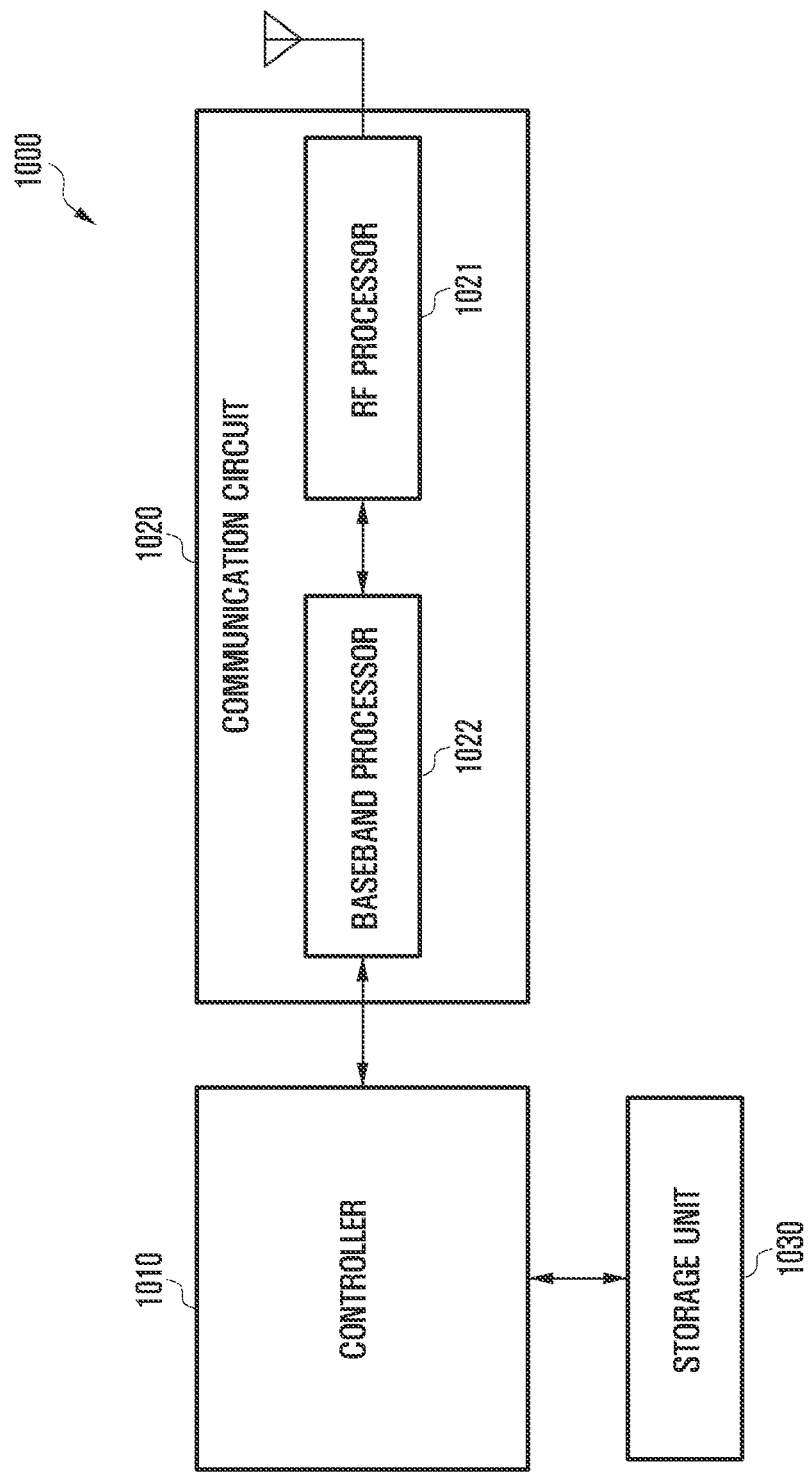
FIG. 10 is a block diagram illustrating a configuration of a UE according to an embodiment of the disclosure.

FIG. 10 is a block diagram illustrating a configuration of a UE according to an embodiment of the disclosure.

The UE 1100 of FIG. 10 may correspond to the UE 101 in FIG. 1, the UE 301 in FIG. 3, the UE 401 in FIG. 4, and the UE 501 in FIG. 5.

In FIG. 10, the UE 1100 includes a controller, a communication circuit 1120, and a storage unit 1130.

The communication circuit 1120 may include a radio frequency (RF) processor 1021 and a baseband processor 1022.

The RF processor 1021 performs a function for transmitting/receiving signals through a radio channel such as signal band conversion and amplification. That is, the RF processor 1021 up-converts a baseband signal from the baseband processor 1022 to produce an RF band signal that that can be transmitted through an antenna and down-converts an RF signal received by the antenna to produce a baseband signal. The RF processor 1021 may include a transmit filter, a receive filter, an amplifier, a mixer, an oscillator, a digital-to-analog convertor (DAC), and an analog-to-digital convertor (ADC). Although a single antenna is shown in FIG. 10, the UE 1000 may be provided with multiple antennas. The RF processor 1021 may include multiple RF chains. The RF processor 1021 may perform beamforming. In order to form a beam, the RF processor 1021 may adjust phases and sizes of signals being transmitted/received through multiple antennas or antenna elements. The RF processor may also perform a MIMO operation to receive multiple layers. The RF processor 1021 may configure a plurality of antennas or antenna elements appropriately to perform reception beam sweeping and adjust a reception direction and width for matching with the transmission beam under the control of the controller.

The baseband processor 1022 takes charge of conversion between baseband signals and bit strings according to a physical layer protocol of the system. For example, the baseband processor 1022 performs encoding and modulation on the transmit bit strings to generate complex symbols in data transmission mode. The baseband processor 1022 also performs demodulation and decoding on a baseband signal from the RF processor 1021 to recover the received bit strings in data reception mode. For the case of an orthogonal frequency division multiplexing (OFDM) system, the baseband processor 1022 performs encoding and modulation on the transmit bit strings to generate complex symbols, maps the complex symbols to subcarriers, performs inverse fast Fourier transform (IFFT) on the subcarriers, and inserts a cyclic prefix (CP) to generate OFDM symbols in the data transmission mode. The baseband processor 1022 splits the baseband signal from the RF processor 1021 into OFDM symbols, recovers the signals mapped to the subcarriers through fast Fourier transform (FFT), and performs demodulation and decoding to recover the bit strings in the data reception mode.

The baseband processor 1022 and the RF processor 1021 take charge of transmitting and receiving signals as described above. Accordingly, the baseband processor 1022 and the RF processor 1021 may be referred to as a communication circuit 1020, a transmitter, a receiver, and a transceiver. At least one of the baseband processor 1022 and the RF processor 1021 may include a plurality of communication modules for supporting different radio access technologies. At least one of the baseband processor 1022 and the RF processor 1021 may include a plurality of communication modules for processing different frequency band signals. Examples of the radio access technologies include LTE network and RR network. Examples of the different frequency bands may include super high frequency (SHF) band (e.g., 2.5 GHz and 5 GHz) and millimeter wave (mmWave) bands (e.g., 60 GHz).

The storage unit (or memory) 1030 stores basic programs for operation of the terminal, application programs, and data such as configuration information. The storage unit 1030 provides the stored data in response to a request from the controller 1010. For example, the storage unit 1030 may store a TA value acquired through a preemptive RACH procedure for use in the next RACH procedure as proposed in the disclosure. The storage unit 1030 may also store a TA value calculated for a target cell based on the TA value of the source cell and frame timing difference information and time synchronization information between base stations. The storage unit 1030 may be implemented with a single memory or a plurality of memory devices. In the following description, the term "storage unit" is used to cover both the cases.

The controller (or processor) 1010 controls overall operations of the UE 1000. For example, the controller 1010 may transmit/receive signals by means of the communication circuit 1020. The controller 1010 also writes and reads data to and from the storage unit 1030. In order to accomplish this, the controller 1010 may include at least one processor. For example, the controller 1010 may include a communication processor (CP) for controlling communication and an application processor (AP) for controlling a higher layer such as application programs.

According to various embodiments, if an RRC layer connection established between the UE 1000 and a base station is released, the storage unit 1030 may store a TA value acquired through an RACH procedure for establishing an RRC layer connection. The controller 1010 may control the communication circuit 1020 to receive an uplink resource allocation message indicating uplink resources allocated to the UE 1000 from the base station after releasing the RRC layer connection. If it is determined to reestablish an RRC layer connection between the UE 1000 and the base station, the controller 1010 may establish an RRC layer connection with the base station based on the previously store TA value and allocated uplink resources, dispensing with at least part of the RACH procedure.

In this case, the controller 1010 may control the communication circuit 1020 to receive a message including information indicating that the base station dispenses with at least part of the RACH procedure.

Here, the information indicating that the base station dispenses with at least part of the RACH procedure may be included in the RRC Connection Release message being transmitted from the base station to the UE 1000.

According to various embodiments, the UE may store a TA value acquired through at least part of the RACH procedure with a handover target cell base station in the storage unit 1030 while in communication with a source cell base station. The controller 101 may control the communication circuit 1020 to receive an uplink resource allocation message indicating uplink resources allocated to the UE 1000 from the target cell base station. The controller 1010 may establish an RRC layer connection with the target cell base station based on a previously stored TA value and allocated uplink resources.

In the case where the UE 1000 makes a handover decision, the controller 1010 may establish an RRC layer connection with the target cell base station based on a previously stored TA value and allocated uplink resources.

In the case where the source cell base station makes a handover decision for the UE 1000, the uplink resource allocation message may be an uplink resource allocation message transmitted based on an uplink resource allocation request message transmitted from the source cell base station to the target cell base station.

The controller 1010 may control the communication circuit 1020 to transmit a message indicative of dispensing with at least part of the RACH procedure based on the TA value being stored. In the case where the uplink resource allocation message is received from the target cell base station, the controller 1010 may control the communication circuit 1020 to receive an uplink resource allocation message indicating uplink resources allocated to the UE 1000 from the target cell base station based on the message indicative of dispensing with at least part of the RACH procedure.

The controller 1010 may control the communication circuit 1020 to receive a message including information indicating that the target cell base station dispenses with at least part of the RACH procedure from the target cell base station. Here, the information indicating that the target cell base station dispenses with at least part of the RACH procedure may be included in the RRC Connection Reconfiguration message being transmitted from the source cell base station to the UE 1000.

In addition to the above described operations, the controller 1010 may perform control operations to be described later with reference to flowcharts as well as the control operations described with reference to FIGS. 1 to 6.

Figure 11:
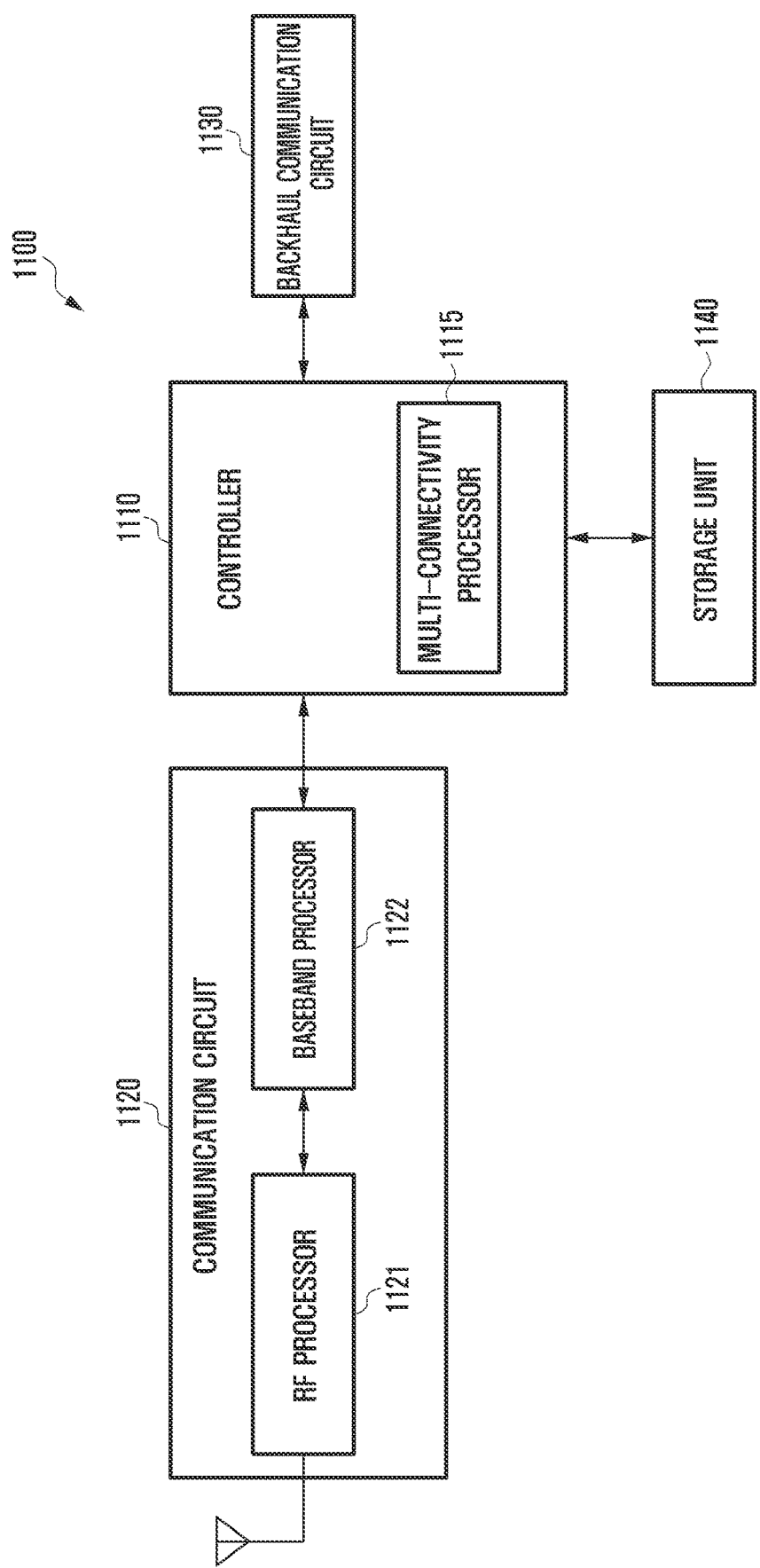
FIG. 11 is a block diagram illustrating a configuration of a base station according to an embodiment of the disclosure.

FIG. 11 is a block diagram illustrating a configuration of a base station according to an embodiment of the disclosure.

The base station 1100 of FIG. 11 may correspond to the base station 102 in FIG. 1, the base station 302 in FIG. 3, the base stations 402 ad 403 in FIG. 4, and the base stations 502 and 503 in FIG. 5.

In FIG. 11, the base station 1100 includes a controller 1110, a communication circuit 1120, and a backhaul communication circuit 1130.

The communication circuit 1120 includes an RF processor 1121 and a baseband processor 1122.

The RF processor 1121 performs a function for transmitting/receiving signals through a radio channel such as signal band conversion and amplification. That is, the RF processor 1121 up-converts a baseband signal from the baseband processor 1122 to produce an RF band signal that that can be transmitted through an antenna and down-converts an RF signal received by the antenna to produce a baseband signal. The RF processor 1121 may include a transmit filter, a receive filter, an amplifier, a mixer, an oscillator, a DAC, and an ADC. Although a single antenna is shown in FIG. 10, the base station 1100 may be provided with multiple antennas. The RF processor 1121 may include multiple RF chains. The RF processor 1121 may perform beamforming. In order to form a beam, the RF processor 1121 may adjust phases and sizes of signals being transmitted/received through multiple antennas or antenna elements. The RF processor may transmit one or more layers to perform a downlink MIMO operation.

The baseband processor 1122 takes charge of conversion between baseband signals and bit strings according to a physical layer protocol of the system. For example, the baseband processor 1122 performs encoding and modulation on the transmit bit strings to generate complex symbols in data transmission mode. The baseband processor 1122 also performs demodulation and decoding on a baseband signal from the RF processor 1121 to recover the received bit strings in data reception mode. For the case of employing an OFDM scheme, the baseband processor 1122 performs encoding and modulation on the transmit bit strings to generate complex symbols, maps the complex symbols to subcarriers, performs IFFT on the subcarriers, and inserts a CP to generate OFDM symbols in the data transmission mode. The baseband processor 1122 splits the baseband signal from the RF processor 1121 into OFDM symbols, recovers the signals mapped to the subcarriers through FFT, and performs demodulation and decoding to recover the bit strings in the data reception mode. The baseband processor 1122 and the RF processor 1121 transmit and receive signals as described above. Accordingly, the baseband processor 1122 and the RF processor 1121 may be referred to as a communication circuit 1120, a transmitter, a receiver, a transceiver, or a radio communication circuit.

The backhaul communication circuit 1130 provides an interface for communication with other network nodes. That is, the backhaul communication circuit 1130 may provide an interface for communication with a high level node and an interface for communication with neighboring base stations.

The storage unit (or memory 1140) stores data such as basic programs for operation of the base station 1100, application programs, and configuration information. In particular, the storage unit 1140 may store information on a bearer allocated to an attached UE and a measurement result reported by the attached UE. The storage unit 1140 may also store information such as criteria for determining whether to enable or disable multi-connectivity for the UE. The storage unit 1140 may provide stored data in response to a request from the controller 1110. The storage unit 1140 may also store information on synchronization states with neighboring base stations. The storage unit may also store information indicative of dispensing with part or all of an RA procedure for the UE and related control information. The storage unit 1140 may also store information necessary for the operations described with reference to FIGS. 1 to 6 and/or related control information and information necessary for operations to be described later and/or related control information.

The controller (or processor) 1110 controls overall operations of the base station 1100. For example, the controller 1110 transmits/receives signals by means of the baseband processor 1122 and the RF processor 1121 or by means of the backhaul communication circuit 1130. The controller 1110 writes and reads data to and from the storage unit 1140. In order to accomplish this, the controller 1110 may include at least one processor. The controller 1110 may also control an operation of dispensing with part or all of the RA procedure for the UE and operations described with reference to FIGS. 1 to 6 and to be described later.

Figure 12:
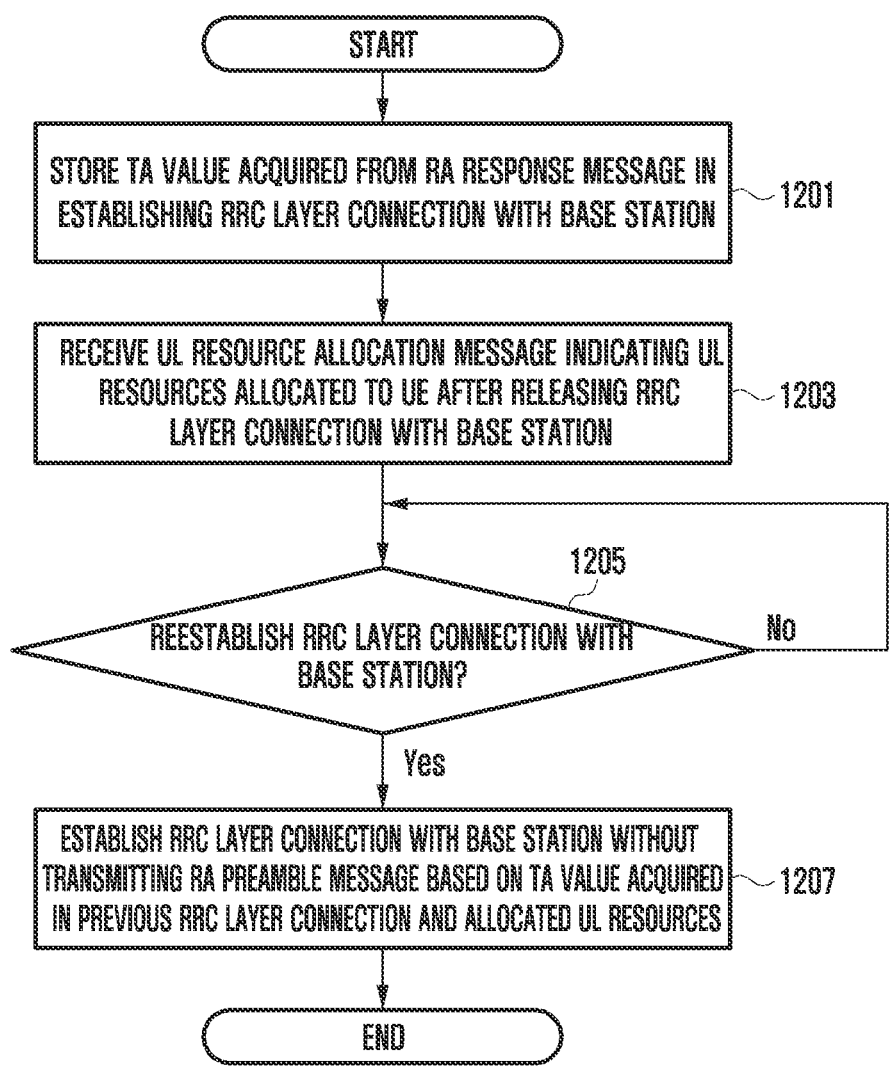
FIGS. 12 to 14 are flowcharts illustrating a procedure for a terminal to establish an RRC layer connection with a base station according to an embodiment of the disclosure.

FIG. 12 is a flowchart illustrating a method for a UE to establish an RRC layer connection with a base station according to an embodiment of the disclosure.

At step 1201, the UE may store a TA value acquired from an RA response message while establishing an RRC layer connection with the base station.

At step 1203, the UE may release the RRC layer connection and receive an uplink resource allocation message indicating uplink resources allocated to the UE. For example, the UE may receive the uplink resource allocation message from the base station periodically.

At step 1205, the UE may determine again whether to establish an RRC layer connection with the base station.

If it is determined again to establish an RRC layer connection with the base station, the UE may establish an RRC layer connection with the base station at step 1207 based on the TA value acquired and uplink resources allocated in the previous RRC layer connection procedure without transmitting an RA preamble message.

Figure 13:
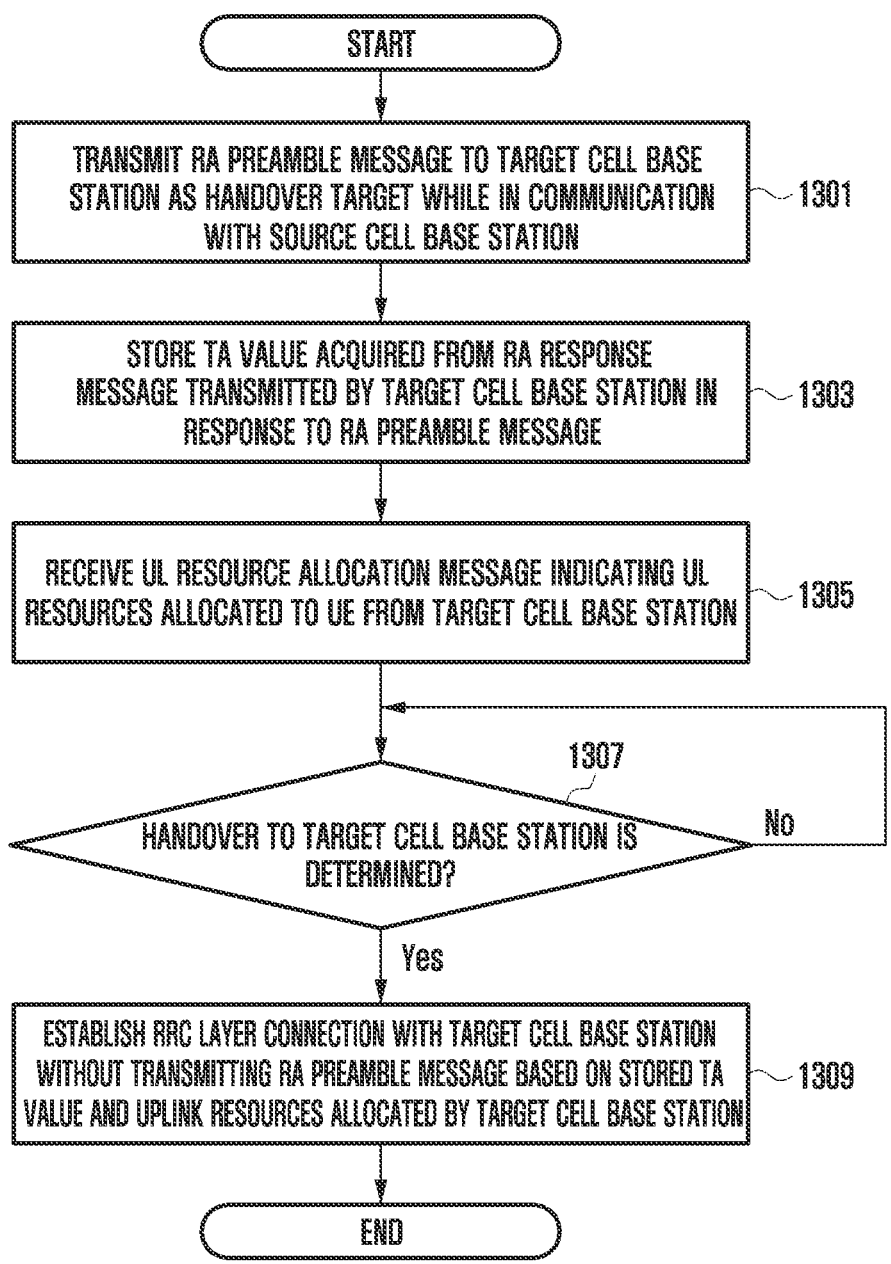

FIG. 13 is a flowchart illustrating a method for a UE to establish an RRC layer connection with a base station according to another embodiment of the disclosure.

At step 1301, the UE may transmit an RA preamble message to a handover target cell base station while communicating with a source cell base station. For example, if the UE receives a message including information indicative of dispensing with at least part of an RACH procedure with the target cell base station from the source cell base station, it may transmit the RA preamble message to the target cell base station.

At step 1303, the UE may store a TA value acquired from an RA response message transmitted by the target cell base station in response to the RA preamble message.

In the case where the base stations are time-synchronized, the UE may calculate a TA value based on a TASource and SSTD and store the TA value, dispensing with (omitting) steps 1301 and 1303.

At step 1305, the UE may receive an uplink resource allocation message indicating uplink resources allocated by the target cell base station to the UE from the target cell base station.

In this case, the UE may transmit to the target cell base station a message indicative of dispensing with at least part of the RACH procedure based on the TA value being stored.

The UE may receive the uplink resource allocation message from the target cell base station in response to the message indicative of dispensing with at least part of the RACH procedure.

In this situation, the UE may determine at step 1307 whether to perform a handover to the target cell base station.

If it is determined to perform a handover, the UE may establish an RRC layer connection with the target cell base station at step 1309 based on the stored TA value and uplink resources allocated by the target cell base station without transmitting an RA preamble message.

Figure 14:
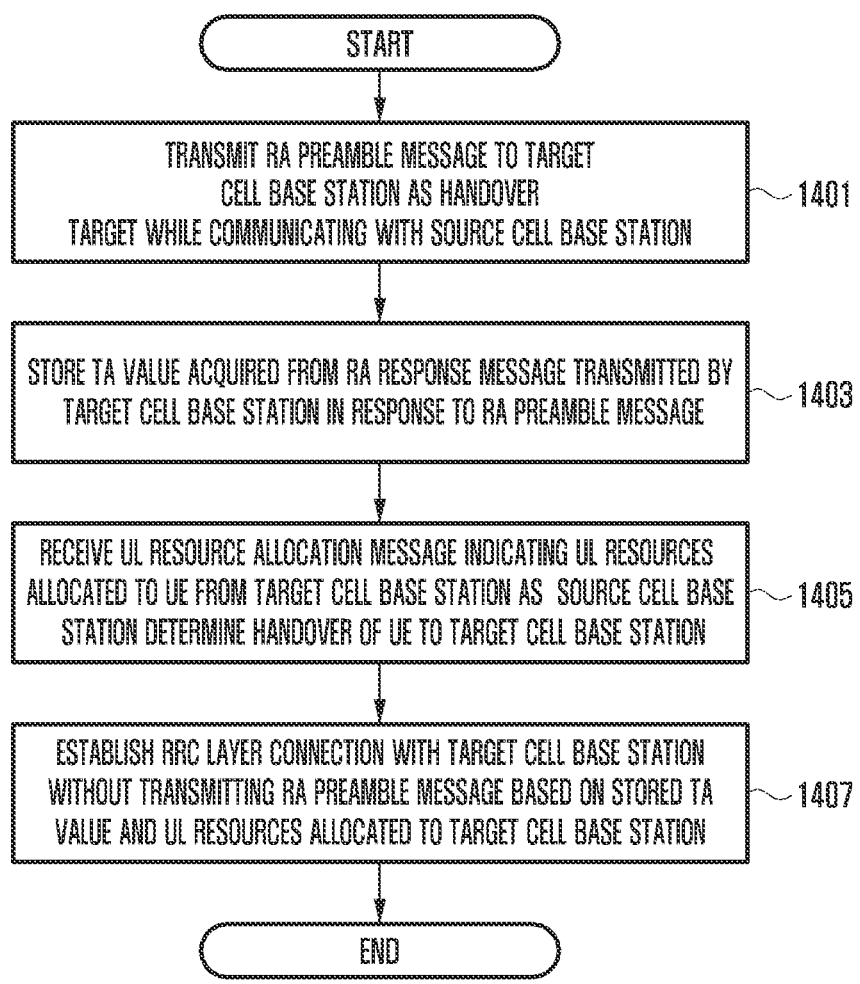

FIG. 14 is a flowchart illustrating a method for a UE to establish an RRC layer connection with a base station according to another embodiment of the disclosure.

At step 1401, the UE may transmit an RA preamble message to a handover target cell base station while communicating with a source cell base station. For example, if the UE receives a message including information indicative of dispensing with at least part of an RACH procedure with the target cell base station from the source cell base station, it may transmit the RA preamble message to the target cell base station.

At step 1403, the UE may store a TA value acquired from an RA response message transmitted by the target cell base station in response to the RA preamble message.

In the case where the base stations are time-synchronized, the UE may calculate a TA value based on a TASource and SSTD and store the TA value, dispensing with (omitting) steps 1401 and 1403.

If a decision is made for a handover from the source cell base station to the target cell base station, the UE may receive, at step 1405, an uplink resource allocation message indicating uplink resources allocated to the UE from the target cell base station.

At step 1407, the UE may establish an RRC layer connection with the target cell base station based on the stored TA value and the uplink resources allocated by the target cell base station without transmitting an RA preamble message.

Figure 15:
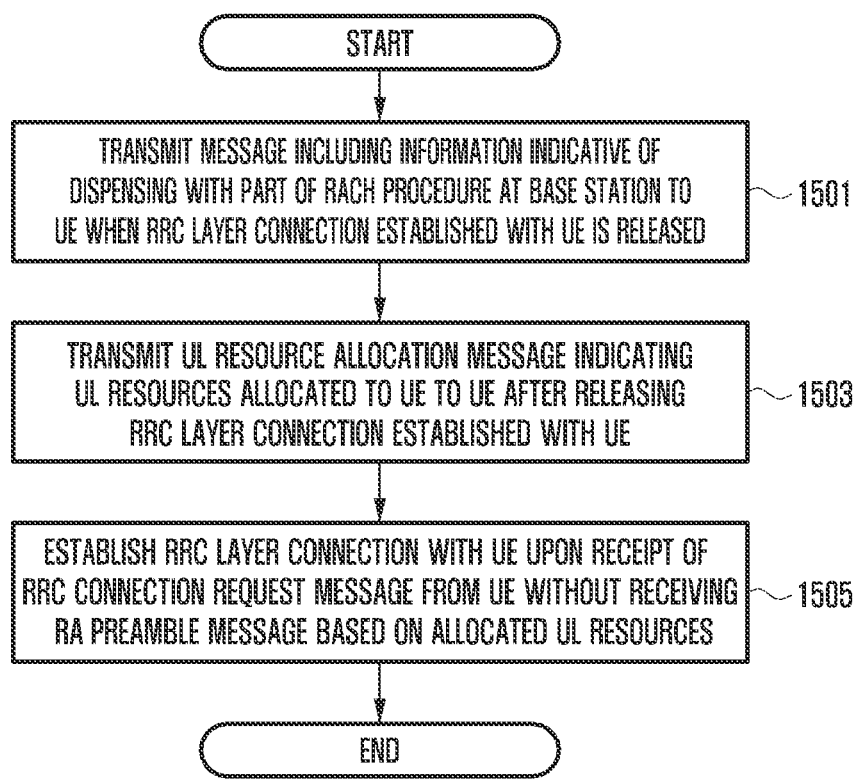
FIGS. 15 to 17 are flowcharts illustrating a procedure for a base station to establish an RRC layer connection with a terminal according to an embodiment of the disclosure.

FIG. 15 is a flowchart illustrating a method for a base station to establish an RRC layer connection with a UE according to an embodiment of the disclosure.

In the case of releasing an RRC layer connection established with the UE, the base station may transmit, at step 1501, to the UE a message including information indicating that the base station dispenses with at least part of an RACH procedure.

At step 1503, the base station may release the RRC layer connection established with the UE and transmit to the UE an uplink resource allocation message indicating uplink resources allocated to the UE.

At step 1505, the base station may establish an RRC layer connection with the UE based on the allocated uplink resources upon receipt of an RRC connection request message from the UE, without receiving an RA preamble message.

Figure 16:
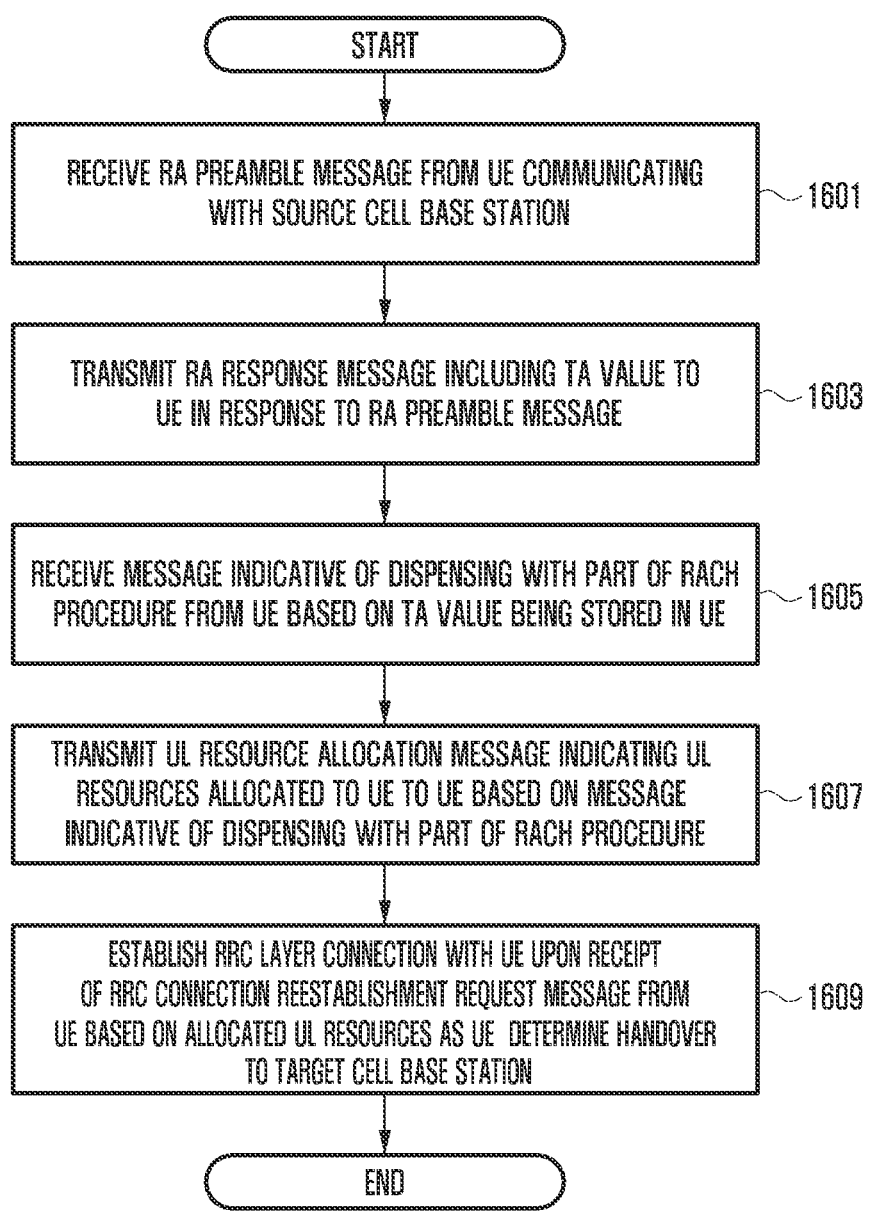

FIG. 16 is a flowchart illustrating a method for a base station to establish an RRC layer connection with a UE according to another embodiment of the disclosure.

At step 1601, the base station may receive an RA preamble message from the UE that is in communication with a source cell base station.

At step 1603, the base station may transmit to the UE an RA response message including a TA value in response to the RA preamble message.

At step 1605, the base station may receive a message indicative of dispensing with at least part of an RACH procedure based on the TA value being stored in the UE.

At step 1607, the base station may transmit to the UE an uplink resource allocation message indicating uplink resources allocated to the UE in response to the message indicative of dispensing at least part of the RACH procedure.

In the case where the base stations are time-synchronized, the base station may dispense with steps 1601 to 1605, and the UE may calculate a TA value using a TASource and SSTD and store the calculated TA value. In this case, the base station may transmit to the UE an uplink resource allocation message indicating uplink resources allocated to the UE without receiving any message.

As the UE makes a handover decision to the target cell base station, the base station may establish an RRC layer connection with the UE upon receipt of an RRC Connection Reestablishment Request message on the allocated uplink resources.

Figure 17:
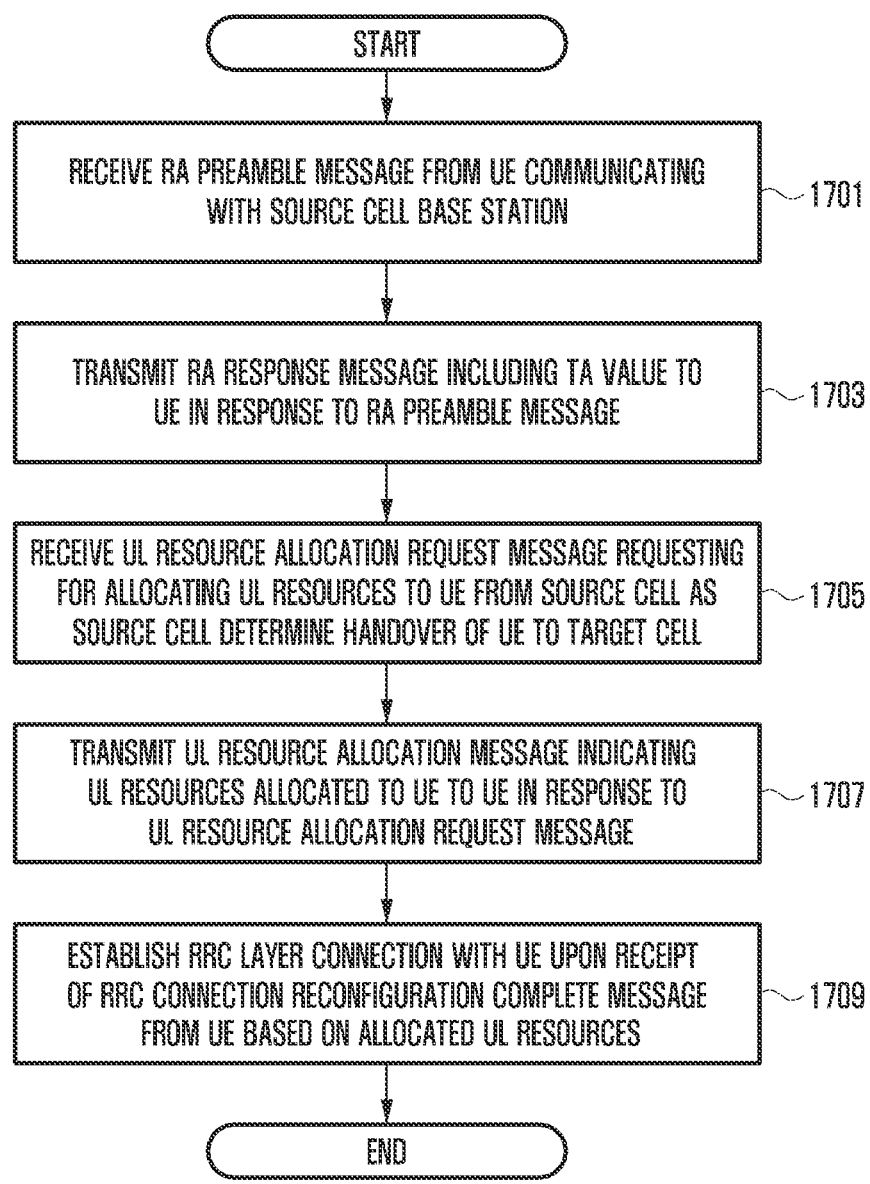

FIG. 17 is a flowchart illustrating a method for a base station to establish an RRC layer connection with a UE according to another embodiment of the disclosure.

At step 1701, the base station may receive an RA preamble message from the UE that is in communication with a source cell base station.

At step 1703, the base station may transmit to the UE an RA response message including a TA value in response to the RA preamble message.

In the case where the base stations are time-synchronized, the base station may dispense with (skip) steps 1701 and 1703, and the UE may calculate a TA value with a TASource and SSTD and store the calculated TA value. In this case, the base station may transmit to the UE an uplink resource allocation message indicating uplink resources allocated to the UE without receiving any message.

As the source cell base station makes a handover decision to the target cell base station for the UE, the base station may receive an uplink resource allocation request message from the source cell base station at step 1705, the message requesting for uplink resources to the UE.

At step 1707, the base station may transmit to the UE an uplink resource allocation message indicating uplink resources allocated to the UE in response to the uplink resource allocation request message.

At step 1709, the base station may establish an RRC layer connection with the UE upon receipt of an RRC Connection Reconfiguration Complete message on the allocated uplink resources.

Disclosed embodiments may be implemented in the form of an S/W program including instructions stored in a computer-readable storage medium.

As a device capable of invoking an instruction from the storage medium and executing the instruction to perform an operation according to a disclosed embodiment, examples of the computer may include the UE and base station appearing in the disclosed embodiments.

The computer-readable storage medium may be a non-transitory storage medium. As used herein, the expression "non-transitory" is used to intend that the storage medium includes no signal and is tangible regardless of whether data are stored in the storage medium semi-persistently or temporarily.

A method according to disclosed embodiments may be provided in the form of a computer program product. The computer program product may be traded between a seller and a buyer.

The computer program product may include a software product and a computer-readable storage medium including the software product. For example, the computer program product may include a product being distributed online in the form of a software program (e.g., downloadable app) by a manufacturer of a terminal and a base station or via an electronic market (e.g., Google play store and app store). In the case of the online distribution, at least part of the software program may be stored or generated temporarily in a storage medium. In this case, at least part of the computer program product may be temporarily stored or instantly generated in a storage medium such as a memory of a manufacturer's server, an application store server, or a relay server.

INDUSTRIAL APPLICABILITY

The disclosure is applicable to a wireless communication system in which a UE establishes a radio resource control layer connection with a base station.

The invention claimed is:

1. A method by a source base station for providing handover (HO) of a user equipment (UE) in a wireless communication system, the method comprising:
   receiving, from the UE, a measurement report message including signal quality measurement information;
   determining a handover of the UE based on the measurement report message;
   based on the determination, transmitting, to a target base station, a handover request message including first information associated with a RACHless HO operation for the UE;
   receiving, from the target base station, a handover request acknowledge message including second information associated with the RACHless HO operation for the UE; and
   transmitting, to the UE, a radio resource control (RRC) connection reconfiguration (RRCConnectionReconfiguration) message including the RACHless HO operation,
   wherein an RACHless HO operation indicates a random access (RA) procedure without transmitting an RA preamble to the target base station by the UE.

2. The method of claim 1, wherein the RRCConnectionReconfiguration message includes mobility control information for access of the target base station.

3. The method of claim 2, wherein the mobility control information includes a frequency, and channel for the target base station.

4. The method of claim 1, wherein an uplink grant message for RACHless HO operation of the UE is transmitted by the target base station.

5. The method of claim 1, wherein the first information associated with the RACHless HO operation includes information indicating that the UE supports the RACHless HO operation.

6. The method of claim 1, wherein the second information associated with the RACHless HO operation includes information for synchronization between the UE and the target base station.

7. A method by a target base station for providing handover of a user equipment (UE) from a source base station in a wireless communication system, the method comprising:
   receiving, from the source base station, a handover request message including first information associated with a RACHless HO operation request for the UE;

transmitting, to the source base station, a handover request acknowledge message including second information associated with a RACHless HO operation for the UE; and transmitting, to the UE, an uplink grant message for the RACHless HO operation of the UE, wherein an RACHless HO operation indicates a random access (RA) procedure without transmitting an RA preamble by the UE.

8. The method of claim 7, further comprising:
receiving, from the UE, a RRC connection reconfiguration complete message for conforming the handover.

9. The method of claim 7, wherein the first information associated with the RACHless HO operation includes information indicating that the UE supports the RACHless HO operation.

10. The method of claim 7, wherein the second information associated with the RACHless HO operation includes information for synchronization between the UE and the target base station.

11. The method of claim 7, further comprising:
receiving, from the UE, measurement information for a beam of the target base station; and
communicating with the UE based on the measurement information.

12. A handover (HO) method at a user equipment (UE) in a wireless communication system, the method comprising:
transmitting, to a source base station, a measurement report message including signal quality measurement information;
receiving, from the source base station, a radio resource control (RRC) connection reconfiguration (RRCConnectionReconfiguration) message including information associated with a RACHless HO operation; and
receiving, from a target base station, an uplink grant message for the RACHless HO operation,
wherein an RACHless HO operation indicates a random access (RA) procedure without transmitting an RA preamble by the UE.

13. The method of claim 12, further comprising:
transmitting, to the target base station, a RRC connection reconfiguration complete message for conforming the handover.

14. The method of claim 12, wherein the information associated with a RACHless HO operation includes information for synchronization between the UE and the target base station.

15. The method of claim 12, further comprising:
transmitting, to the target base station, measurement information for a beam of the target base station; and
communicating with the target base station based on the measurement information.

16. A source base station for providing handover (HO) of a user equipment (UE) to a target base station in a wireless communication system, the source base station comprising:
a communication circuit configured to communicate with the UE and the target base station; and
a controller configured to:
receive, from the UE, a measurement report message including signal quality measurement information,
determine a handover of the UE based on the measurement report message,
based on the determination, transmit, to the target base station, a handover request message including an first information associated with a RACHless HO operation request for the UE, receive, from the target base station, a handover request acknowledge message including second information associated with the RACHless HO operation for the UE; and transmit, to the UE, a radio resource control (RRC) connection reconfiguration (RRCConnectionReconfiguration) message including the RACHless HO operation, wherein an RACHless HO operation indicates a random access (RA) procedure without transmitting an RA preamble to the target base station by the UE.

17. The source base station of claim 16, wherein the RRCConnectionReconfiguration message includes mobility control information for access of the target base station.

18. The source base station of claim 17, wherein the mobility control information includes a frequency, and channel for the target base station.

19. The source base station of claim 16, wherein the first information associated with the RACHless HO operation includes information indicating that the UE supports the RACHless HO operation.

20. The source base station of claim 16, wherein the second information associated with the RACHless HO operation includes information for synchronization between the UE and the target base station.

21. The source base station of claim 16, wherein an uplink grant message for RACHless HO operation of the UE is transmitted by the target base station.

22. A target base station for providing handover (HO) of a user equipment (UE) form a source base station in a wireless communication system, the target base station comprising:
a communication circuit configured to communicate with the UE and the target base station; and
a controller configured to:
receive, from the source base station, a handover request message including first information associated with a RACHless HO operation request for the UE,
transmit, to the source base station, a handover request acknowledge message including second information associated with a RACHless HO operation for the UE, and
transmit, to the UE, an uplink grant message for the RACHless HO operation of the UE,
wherein an RACHless HO operation indicates a random access (RA) procedure without transmitting an RA preamble by the UE.

23. The target base station of claim 22, wherein the controller is further configured to receive, from the UE, a RRC connection reconfiguration complete message for conforming the handover.

24. The target base station of claim 22, wherein the first information associated with the RACHless HO operation includes information indicating that the UE supports the RACHless HO operation.

25. The target base station of claim 22, wherein the second information associated with the RACHless HO operation includes information for synchronization between the UE and the target base station.

26. The target base station of claim 22, herein the controller is further configured to:
receive, from the UE, measurement information for a beam of the target base station, and
communicate with the UE based on the measurement information.

27. A user equipment (UE) for handover in a wireless communication system, the UE comprising:
- a communication circuit configured to communicate with a base station; and
- a controller configured to control the communication circuit to:
  - transmit, to a source base station, a measurement report message including signal quality measurement information,
  - receive, from the source base station, a radio resource control (RRC) connection reconfiguration (RRCConnectionReconfiguration) message including a RACHless operation information, and
  - receive, from a target base station, an uplink grant message,
- wherein the RACHless operation indicates a random access (RA) procedure without transmitting an RA preamble by the UE.

28. The UE of claim 27, wherein the controller is further configured to transmit, to the target base station, a RRC connection reconfiguration complete message for conforming the handover.

29. The UE of claim 27, wherein the information associated with a RACHless HO operation includes information for synchronization between the UE and the target base station.

30. The UE of claim 27, wherein the controller is further configured to:
- transmit, to the target base station, measurement information for a beam of the target base station, and
- communicate with the target base station based on the measurement information.

\* \* \* \* \*